United States Patent
Zhang et al.

(10) Patent No.: US 10,505,934 B2
(45) Date of Patent: Dec. 10, 2019

(54) SENSITIVE INFORMATION PROCESSING METHOD, DEVICE AND SERVER, AND SECURITY DETERMINATION SYSTEM

(71) Applicant: Alibaba Group Holding Limited, Grand Cayman (KY)

(72) Inventors: Xiang Zhang, Hangzhou (CN); Jianping Lv, Hangzhou (CN); Zhengrong Chen, Hangzhou (CN); Ke Yang, Hangzhou (CN); Huiqing Xu, Hangzhou (CN); Wei Mou, Hangzhou (CN); Xingang Wang, Hangzhou (CN); Chao Sun, Hangzhou (CN); Xiaoxue Yu, Hangzhou (CN); Qinfei Jiang, Hangzhou (CN); Hanxiao Xiao, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 248 days.

(21) Appl. No.: 15/448,504

(22) Filed: Mar. 2, 2017

(65) Prior Publication Data
US 2017/0180376 A1    Jun. 22, 2017

Related U.S. Application Data

(63) Continuation of application No. PCT/CN2015/088214, filed on Aug. 27, 2015.

(30) Foreign Application Priority Data

Sep. 3, 2014 (CN) .......................... 2014 1 0446695

(51) Int. Cl.
*H04L 29/00* (2006.01)
*H04L 29/06* (2006.01)
*H04L 29/08* (2006.01)

(52) U.S. Cl.
CPC .............. *H04L 63/10* (2013.01); *H04L 29/06* (2013.01); *H04L 63/0281* (2013.01);
(Continued)

(58) Field of Classification Search
CPC ..... H04L 63/10; H04L 63/0281; H04L 29/06; H04L 67/02; H04L 67/42; H04L 2209/04
See application file for complete search history.

(56) References Cited

U.S. PATENT DOCUMENTS

2002/0054587 A1* 5/2002 Baker ................. G06F 11/0709
370/352
2004/0117501 A1  6/2004 Day et al.
(Continued)

FOREIGN PATENT DOCUMENTS

CN   101814118       8/2010
CN   102169610 A     8/2011
(Continued)

OTHER PUBLICATIONS

Bhatti et al., "XML-based specification for Web services document security", Computer ( vol. 37 , Issue: 4 , April (Year: 2004).*
(Continued)

*Primary Examiner* — Morshed Mehedi
(74) *Attorney, Agent, or Firm* — Lee & Hayes, P.C.

(57) ABSTRACT

A sensitive information processing method, device and server, and a security determination system. The method includes acquiring to-be-processed information in a page; determining whether the to-be-processed information is sensitive information according to a preset sensitive information identification strategy; performing processing according to a preset sensitive information processing strategy when the to-be-processed information is sensitive information, to form processed sensitive information; and substituting the corresponding to-be-processed information in the page with
(Continued)

the processed sensitive information, to form a page with the processed sensitive information. By using the example embodiments of the present application, identification and processing for sensitive information in a page returned to a user may be completed on a server terminal, which improves the security of the sensitive information in the page.

20 Claims, 12 Drawing Sheets

(52) U.S. Cl.
CPC .............. *H04L 67/02* (2013.01); *H04L 67/42* (2013.01); *H04L 2209/04* (2013.01)

(56) References Cited

U.S. PATENT DOCUMENTS

| | | | |
|---|---|---|---|
| 2006/0064313 A1* | 3/2006 | Steinbarth | G06Q 10/10 705/322 |
| 2006/0236363 A1* | 10/2006 | Heard | H04L 63/101 726/1 |
| 2009/0144829 A1* | 6/2009 | Grigsby | G06F 21/6263 726/26 |
| 2009/0299784 A1* | 12/2009 | Guller | G06Q 20/10 705/39 |
| 2012/0102414 A1 | 4/2012 | Demant et al. | |
| 2014/0195798 A1* | 7/2014 | Brugger | H04L 63/0227 713/154 |
| 2015/0073868 A1* | 3/2015 | Garman | G06Q 10/02 705/7.31 |
| 2017/0118215 A1* | 4/2017 | Varadarajan | H04L 63/0236 |
| 2017/0132186 A1* | 5/2017 | Plummer | G09C 1/00 |

FOREIGN PATENT DOCUMENTS

| | | |
|---|---|---|
| CN | 102467628 A | 5/2012 |
| CN | 102594557 | 7/2012 |
| CN | 103929407 | 7/2014 |
| JP | 2005092891 | 4/2005 |
| JP | 2012252425 | 12/2012 |

OTHER PUBLICATIONS

The Extended European Search Report dated Apr. 6, 2018 for European Patent Application No. 15837690.5, 8 pages.

Translation of International Search Report from corresponding PCT application No. PCT/CN2015/088214 dated Nov. 20, 2015, 2 pages.

Translation of Written Opinion from corresponding PCT application No. PCT/CN2015/088214 dated Nov. 20, 2015, 6 pages.

Translation of Chinese Search Report from corresponding CN Patent Application No. 2014104466956, dated Jan. 25, 2018, 2 pages.

He,Chongtian, "Asp.net MVC: Using Filters to Filter Sensitive Information," from <<https://www.cnblogs.com/ldp615/archive/2010/07/29/Sensitive>>, published Jul. 29, 2010, 3 pages.

The Chinese Office Action dated Feb. 20, 2018 for Chinese patent application No. 201410446695.6, a counterpart foreign application of U.S. Appl. No. 15/448,504, 11 pages.

Translated Japanese Office Action dated Mar. 12, 2019 for Japanese Patent Application No. 2017-512318, a counterpart of U.S. Appl. No. 15/448,504, 9 pages.

* cited by examiner

US 10,505,934 B2

SENSITIVE INFORMATION PROCESSING METHOD, DEVICE AND SERVER, AND SECURITY DETERMINATION SYSTEM

CROSS REFERENCE TO RELATED PATENT APPLICATIONS

This application claims priority to and is a continuation of PCT Patent Application No. PCT/CN2015/088214, filed on 27 Aug. 2015, which claims priority to Chinese Patent Application No. 201410446695.6, filed on 3 Sep. 2014, entitled "SENSITIVE INFORMATION PROCESSING METHOD, DEVICE AND SERVER, AND SECURITY DETERMINATION SYSTEM," which are hereby incorporated by reference in their entirety.

TECHNICAL FIELD

The present application relates to the field of information communications, and in particular, to a sensitive information processing method, device and server, and a security determination system in computer page information interaction.

BACKGROUND

With the development of information technology, acquiring information from the Internet has become an important information acquisition means for people, wherein a major means includes sending an HTTP page request to a server by using a browser on a client terminal, such that the server responds to the HTTP request and returns requested page information to the client terminal, for a user of the client terminal to browse.

A page returned by the server usually includes sensitive information related to the user, such as an account name, a mailing address, a mobile phone number, and identity card information of the user. An illegal user can acquire sensitive information in the page easily by viewing the source code of the page, crawling web data packets on the web, and the like, leading to leakage of user information. For example, information after "mailto:" or information in front of and after "@" may be extracted from the page information by using a network tool, to achieve the objective of extracting Email information in the page.

In the conventional techniques, common methods for processing sensitive information include processing methods such as encrypting and masking sensitivity by using a JavaScript script embedded in the page, or preventing an illegal user from capturing packets in the page returned by the server. For example, email sensitive information may be transformed into an ASCII coded character string, and then written into the page by using a document.write method in the scripting language of JavaScript, thus completing processing on the email sensitive information.

However, in the conventional techniques, sensitive information in the page returned by the server is usually original sensitive information without procession by JavaScript scripting, and further, even if JavaScript scripting has been performed on the sensitive information in the page, an illegal user can still acquire the sensitive information in the page by low-difficulty means such as deleting the JavaScript script on the client terminal or stopping running of the corresponding JavaScript script. Therefore, the common methods for processing page sensitive information in the conventional techniques cause low security of the sensitive information in the page.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present application is to provide a sensitive information processing method, device and server, and a security determination system, which may improve the security of sensitive information in a page.

The sensitive information processing method, device and server, and the security determination system provided in the present application are implemented as follows:

A sensitive information processing method, including:
acquiring to-be-processed information in a page;
determining whether the to-be-processed information is sensitive information according to a preset sensitive information identification strategy;
performing processing according to a preset sensitive information processing strategy when the to-be-processed information is sensitive information, to form processed sensitive information; and
substituting the corresponding to-be-processed information in the page with the processed sensitive information, to form a page with the processed sensitive information.

The acquiring to-be-processed information in a page may include:
acquiring the to-be-processed information in the page by using an interceptor after a Controller in an MVC framework structure is invoked and before a view is rendered; or
acquiring the to-be-processed information in the page by using an interceptor after a Velocity in an MVC framework structure is invoked.

The to-be-processed information may include variable information in a ModelMap in an MVC framework structure of a page server.

The determining whether the to-be-processed information is the sensitive information according to the preset sensitive information identification strategy may include:
acquiring a variable name of the variable information in the ModelMap in the MVC framework structure of the page server;
comparing the acquired variable name of the variable information in the ModelMap with sensitive information stored in a sensitive information library, to determine whether the variable name is in the sensitive information library; and
determining whether the to-be-processed information is the sensitive information according to the determination result of whether the variable name is in the sensitive information library.

The sensitive information processing method of claim 4, may further include:
determining, according to a preset sensitive information monitoring strategy, whether a value of the variable information in the ModelMap in the MVC framework structure of the page server is to-be-processed sensitive information; and
sending a variable name corresponding to the value of the variable information to the sensitive information library when it is determined according to the sensitive information monitoring strategy that the value of the variable information is to-be-processed sensitive information.

The performing processing according to a preset sensitive information processing strategy may include:

setting a sensitive information processing strategy for values corresponding to different variable names according to the different variable names in the variable information; or setting, in a same variable name of the variable information according to a privilege of specified field information, a sensitive information processing strategy for a value corresponding to the same variable name.

The sensitive information processing strategy may include at least one of the followings:

non-processing;
display of a predetermined part;
completion of masking;
privilege-based masking;
display after transformation; and
misinformation.

A device for implementing sensitive information processing, including:

an information acquisition unit that acquires to-be-processed information in a page;

a sensitive information library that stores sensitive information;

a sensitive information identification unit that determines whether the to-be-processed information is sensitive information on the basis of the sensitive information stored in the sensitive information library;

a processing strategy unit that stores a sensitive information processing strategy; and an information processing unit that processes, when the sensitive information identification unit determines that the to-be-processed information is sensitive information, the to-be-processed information on the basis of the sensitive information processing strategy stored by the processing strategy unit, to form processed sensitive information.

The to-be-processed information acquired by the information acquisition unit may include variable information in a ModelMap in an MVC framework structure of a page server.

The sensitive information processing strategy stored by the processing strategy unit may include:

a sensitive information processing strategy that is set for values corresponding to different variable names according to the different variable names in the variable information; or a sensitive information processing strategy, which is set in a same variable name of the variable information according to a privilege of specified field information, for a value corresponding to the same variable name.

The processing strategy unit may include at least one of the following units:

a predetermined-part display unit that displays a particular field of a value corresponding to the variable name according to a predetermined display rule;

a complete-masking unit that masks all fields of the value corresponding to the variable name according to a predetermined masking rule;

a privilege-based masking unit that processes the value corresponding to the variable name according to a privilege of a specified field;

a transformation and display unit that transform the value corresponding to the variable name according to a predetermined transformation rule, and use the transformed value as the value of the variable name; and a misinformation unit that skips processing the value corresponding to the variable name when any one of the structural modules in the sensitive information processing device is abnormal or the sensitive information identified by the sensitive information identification unit does not conform to a sensitive information determination standard set by a third-party module, and generate a misinformation log.

The sensitive information identification unit may include:

a key value acquisition unit that acquire a variable name of the variable information in the ModelMap in the MVC framework structure of the page server;

a comparison unit that compare whether the acquired variable name of the variable information in the ModelMap is the same as the sensitive information stored in the sensitive information library; and a first determination unit that determines whether the to-be-processed information is sensitive information according to the comparison result of the comparison unit.

The device for implementing sensitive information processing may further include:

a monitoring strategy unit that stores a preset sensitive information monitoring strategy;

a to-be-processed sensitive information unit that determines, according to the preset sensitive information monitoring strategy, whether a value of the variable information in the ModelMap in the MVC framework structure of the page server is to-be-processed sensitive information; and a sending unit that sends a variable name corresponding to the value of the variable information to the sensitive information library when the to-be-processed sensitive information unit determines that the value of the variable information is to-be-processed sensitive information.

The device for implementing sensitive information processing may further include a returning unit that directly sends the processed sensitive information to a server or to a processed sensitive information receiving unit of the server by using an interceptor.

The device for implementing sensitive information processing may further include a substitution unit that substitutes the to-be-processed information in the page with the processed sensitive information.

The present application also provides a server for implementing sensitive information processing, including:

an MVC target system that receives an HTTP request sent by a client terminal, and generates a page template ModelMap according to the HTTP request; transmit to-be-processed information into the generated page template ModelMap, and completes rendering of a page corresponding to the HTTP request; sends the rendered page to the client terminal; receives processed sensitive information sent by a sensitive information processing module, and substitutes the corresponding to-be-processed information in the page template ModelMap with the processed sensitive information;

an interceptor that acquires to-be-processed information in the page template ModelMap; sends the to-be-processed information to the sensitive information processing module; further receives processed sensitive information sent by the sensitive information processing module, and sends the processed sensitive information to the MVC target system; and a sensitive information processing module that receives the to-be-processed information and determines whether the to-be-processed information is sensitive information; processes the to-be-processed information, which is determined to be sensitive information, according to a preset sensitive information processing strategy, to form processed sensitive information;

wherein the sensitive information processing module includes:

an information receiving unit that receives to-be-processed information;

a first sensitive information library that stores sensitive information;

a first sensitive information identification unit that determines, on the basis of the sensitive information stored in the first sensitive information library, whether the to-be-processed information is sensitive information;

a first processing strategy unit that stores the sensitive information processing strategy;

a first information processing unit that processes, when the first sensitive information identification unit determines that the to-be-processed information is sensitive information, the to-be-processed information on the basis of the sensitive information processing strategy stored by the first processing strategy unit, to form processed sensitive information; and a first returning unit that sends the processed sensitive information to the interceptor.

The acquiring, by the interceptor, to-be-processed information in the page template ModelMap may include acquiring the to-be-processed information in the page template ModelMap by using a postHandle or afterCompletion processing program of the interceptor.

The first processing strategy unit may include at least one of the following units:

a first predetermined-part display unit that displays a particular field of a value corresponding to the variable name according to a predetermined display rule;

a first complete-masking unit that masks all fields of the value corresponding to the variable name according to a predetermined masking rule;

a first privilege-based masking unit that processes the value corresponding to the variable name according to a privilege of a specified field;

a first transformation and display unit that transforms the value corresponding to the variable name according to a predetermined transformation rule, and use the transformed value as the value of the variable name; and a first misinformation unit that skip processing the value corresponding to the variable name when any one of the structural modules in the sensitive information processing device is abnormal or the sensitive information identified by the sensitive information identification unit does not conform to a sensitive information determination standard set by a third-party module, and generate a misinformation log.

The first sensitive information identification unit may include:

a first key value acquisition unit that acquires a variable name of variable information in the ModelMap in the MVC target system;

a first comparison unit that compares whether the acquired variable name of the variable information in the ModelMap is the same as the sensitive information stored in the first sensitive information library; and a second determination unit that determines whether the to-be-processed information is sensitive information according to the comparison result of the first comparison unit.

The server for implementing sensitive information processing may further include:

a first monitoring strategy unit that stores a preset sensitive information monitoring strategy;

a first to-be-processed sensitive information unit that determines, according to the preset sensitive information monitoring strategy, whether a value of the variable information in the ModelMap in the MVC target system is to-be-processed sensitive information; and a first sending unit that sends a variable name corresponding to the value of the variable information to the first sensitive information library when the first to-be-processed sensitive information unit determines that the value of the variable information is to-be-processed sensitive information.

The present disclosure also provides a security determination system, including:

a second sensitive information library that stores sensitive information, receives a variable name sent by a second to-be-processed sensitive information unit, determines whether the stored sensitive information includes the received variable name, and stores the variable name as newly-added sensitive information when the determination result is that the sensitive information library does not comprise the received variable name;

a second sensitive information identification unit that acquires to-be-processed information in a page, and determines whether the to-be-processed information is sensitive information on the basis of the sensitive information stored in the second sensitive information library;

a second information processing unit that stores a sensitive information processing strategy, and further processes, when the second sensitive information identification unit determines that the to-be-processed information is sensitive information, the to-be-processed information on the basis of the stored sensitive information processing strategy, to form processed sensitive information;

a monitoring unit that stores a preset sensitive information monitoring strategy, determines, according to the stored sensitive information monitoring strategy, whether a value of variable information in the page is to-be-processed sensitive information, sends a variable name corresponding to the value of the variable information to the second sensitive information library when determining that the value of the variable information is to-be-processed sensitive information;

a newly-added sensitive information log unit that generates a newly-added sensitive information log, the newly-added sensitive information log including a number of newly-added sensitive information in the second sensitive information library;

a to-be-processed sensitive information log unit that generates a to-be-processed sensitive information log, the to-be-processed sensitive information log including the number of to-be-processed sensitive information determined by the monitoring unit; and a first security determination unit that acquires data in the newly-added sensitive information log or the to-be-processed sensitive information log or the second sensitive information library of a first target system, and determines, according to a preset determination rule, a security level to which the first target system belongs.

The first security determination unit may include at least one of the following units:

a first number determination unit that determines the security level of the first target system according to a number of the newly-added sensitive information within a first time window and/or the number of the sensitive information stored in the second sensitive information library; and a first ratio determination unit that determines the security level of the first target system according to a ratio of a number of the newly-added sensitive information to a number of the to-be-processed sensitive information within a second time window.

The security determination system may further include a second multi-system determination unit that compares the security level of the first target system with that of a second target system according to a preset determination rule, wherein the first security determination unit acquires data in the newly-added sensitive information log or the to-be-processed sensitive information log or the second sensitive information library of the second target system.

The multi-system determination unit may include a second number determination unit that compares the security levels of the first target system and the second target system according to the number of the newly-added sensitive information of the first target system and the second target system within the first time window and/or the numbers of the sensitive information stored in the second sensitive information library.

The multi-system determination unit may include a second ratio determination unit that compares the security levels of the first target system and the second target system according to ratios of the numbers of the newly-added sensitive information of the first target system and the second target system to the number of the to-be-processed sensitive information within the second time window.

The present application provides a sensitive information processing method, device and server, and a security determination system. To-be-processed information may be acquired on a page server terminal, and it is determined, according to a predetermined sensitive information identification strategy, whether the to-be-processed information is sensitive information. When the to-be-processed information is sensitive information, the sensitive information may be processed according to a preset sensitive information processing strategy, and then the processed sensitive information is returned to a page, forming a page with the processed sensitive information. The page received by a client terminal is the page in which sensitive information has been processed on the server terminal, and an illegal user of the client terminal cannot acquire real sensitive information in the page even by capturing data packets or deleting a JavaScript script; in this way, the security of the sensitive information in the page is improved.

BRIEF DESCRIPTION OF THE DRAWINGS

To describe the technical solutions in the example embodiments of the present application or the conventional techniques more clearly, accompanying drawings needed for describing the example embodiments or the conventional techniques will be introduced briefly below. Apparently, the accompanying drawings in the following description are merely some example embodiments in the present application, and those of ordinary skill in the art may obtain other drawings according to these accompanying drawings without creative efforts.

DETAILED DESCRIPTION

To enable those skilled in the art to better understand the technical solutions in the present application, the technical solutions in the example embodiments of the present application will be clearly and completely described below with reference to the accompanying drawings in the example embodiments of the present application. Apparently, the described example embodiments are only some but not all of the example embodiments of the present application. All other example embodiments obtained by those of ordinary skill in the art based on the example embodiments of the present application without creative efforts shall fall in the protection scope of the present application.

An MVC framework is a web application design and creation mode commonly used by a Web server, in which software service logic, data, and interface display are separated by using Model View Controller (MVC), wherein the Model may be used for encapsulating data related to service logic of an application and a data processing method, and generally has a privilege of directly accessing data, for example, accessing a database. The View may be used for displaying data, and generally is a part, which is related to a user interface, in an application, for example, a page interface that a user can browse and interact with. Generally, the view may be created according to the model data. The Controller functions to organize different levels, and may be used for processing an event and making a response. The three modules of the MVC framework mode may be independent of each other, changing one of them may not affect the other two, and one model can be repeatedly used by different views. For example, user A wants to receive and send emails through a browser, and also wants to access an email box through a mobile phone. An MVC framework design mode may be employed on a server terminal, the model may respond to a request of the user and return response data, the view may format data and may present the formatted data to an Internet interface and a WAP interface of a user page.

Figure 1:
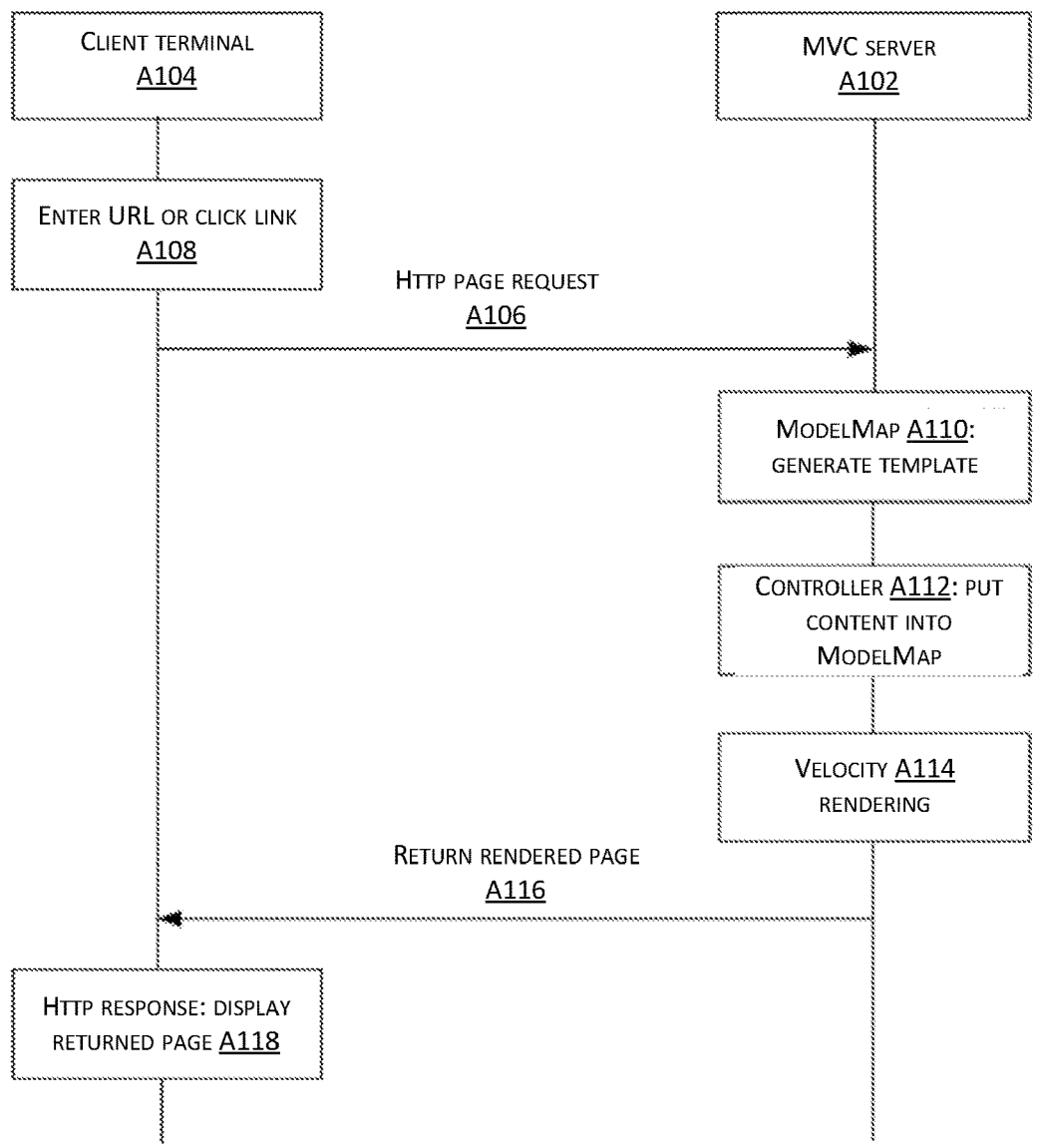
FIG. 1 is a schematic flow chart of interaction between a user and a server according to the present application, where the server uses an MVC framework page structure.

FIG. 1 is a schematic flow chart of interaction between a user and a server, where the server uses an MVC framework page structure. As shown in FIG. 1, the user may send an HTTP request to a Web server (such as MVC server A102) through a browser of a client terminal A104. When the Web server using the MVC framework mode acquires a HTTP page request A106 sent by the user through the browser that enters a URL or clicks a link A108, the Web server generates a corresponding page model according to the HTTP request, and then renders the generated page model. The page model generally may be a page template (ModelMap A110) designed in advance by page design developers or stored in a system. The page template may include variable information. A controller A112 puts the content into the ModelMap A110. Then a velocity A114 renders the page.

The rendering of the page model may include finding the variable information in the page template by using the Controller A112, and substituting a variable in the page module with corresponding real data according to the HTTP request of the user. After completing rendering of the page template (ModelMap A110), the Web server A102 may return the rendered page A116 to the user, and the view module (View) may control a display interface of the rendered page on the client terminal of the user. The http response A118 at the client terminal A104 is to display the returned page.

Figure 2:
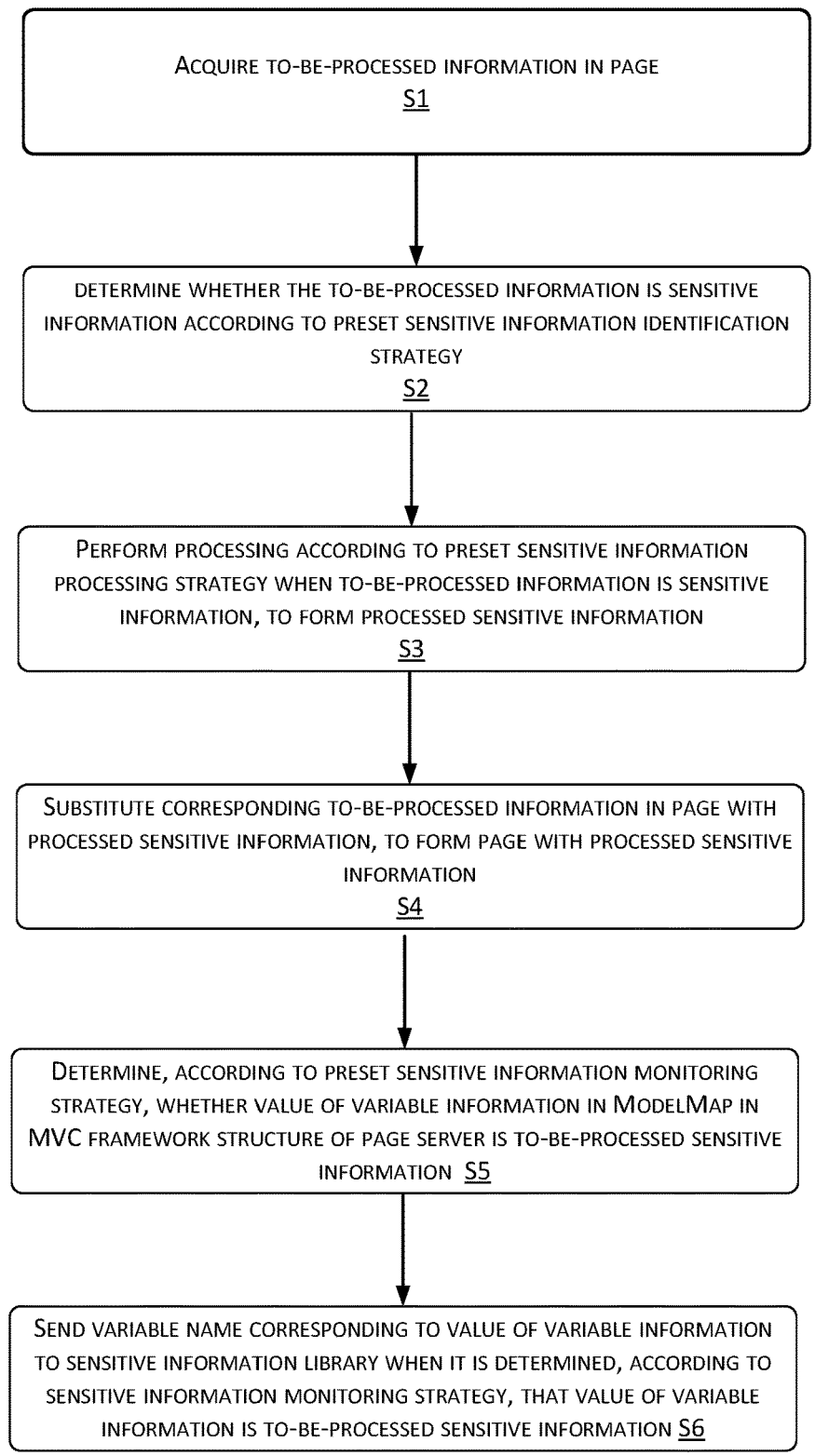
FIG. 2 is a method flow chart of an example embodiment of a sensitive information processing method according to the present application.

The present application provides a sensitive information processing method, which can process sensitive information of a user before a server returns a page to the user, such that sensitive information included in the page received by a client terminal of the user is sensitive information that has been correspondingly processed on a server terminal. FIG. 2 is a method flow chart of an example embodiment of a sensitive information processing method according to the present application. As shown in FIG. 2, the sensitive information processing method may include:

S1: To-be-processed information in a page is acquired.

The to-be-processed information may be set according to a framework structure of a page server. The to-be-processed information in this example embodiment may include variable information in a ModelMap in an MVC framework structure of a page server. When receiving an HTTP request sent by a user terminal, the page server may create a blank ModelMap page template. The page template ModelMap may be a storage structure in the MVC framework structure, and may be used for storing information, in the page, that needs to be returned to the user terminal. In the above description, the page template ModelMap may include a variable, and a data format of the variable is generally a map (key: value) key-value pair data format including a variable name (key) and a value, wherein the variable value "value" generally may employ a null value or a default character string to represent an initial value. In a Controller phase, data may be put into the variable in the ModelMap by using a ModelMap.put( ) operation. For example, a variable set in the ModelMap is (name1: value), a value "Zhang san" of the variable "name1" may be put into the variable "name1" in the ModelMap by means of such an operation as ModelMap.put("name1", "Zhang san").

In this example embodiment, after data is put into the variable in the ModelMap, data of the ModelMap may be acquired, which, in this example embodiment, may refer to acquiring variable information in the ModelMap in the MVC framework structure of the page server, and using the variable information in the ModelMap as the to-be-processed information in the page. It should be noted that, in the sensitive information processing method in the present application, the variable information may be acquired while the page server is putting data into variables in the page, or the variable information in the page may be acquired after the page server finishes putting data into all variables in the page. In this example embodiment, in the page server using the MVC framework structure, the variable information may be acquired after the MVC framework finishes putting data of all variables into the ModelMap, and the variable information is used as the to-be-processed information.

Figure 3:
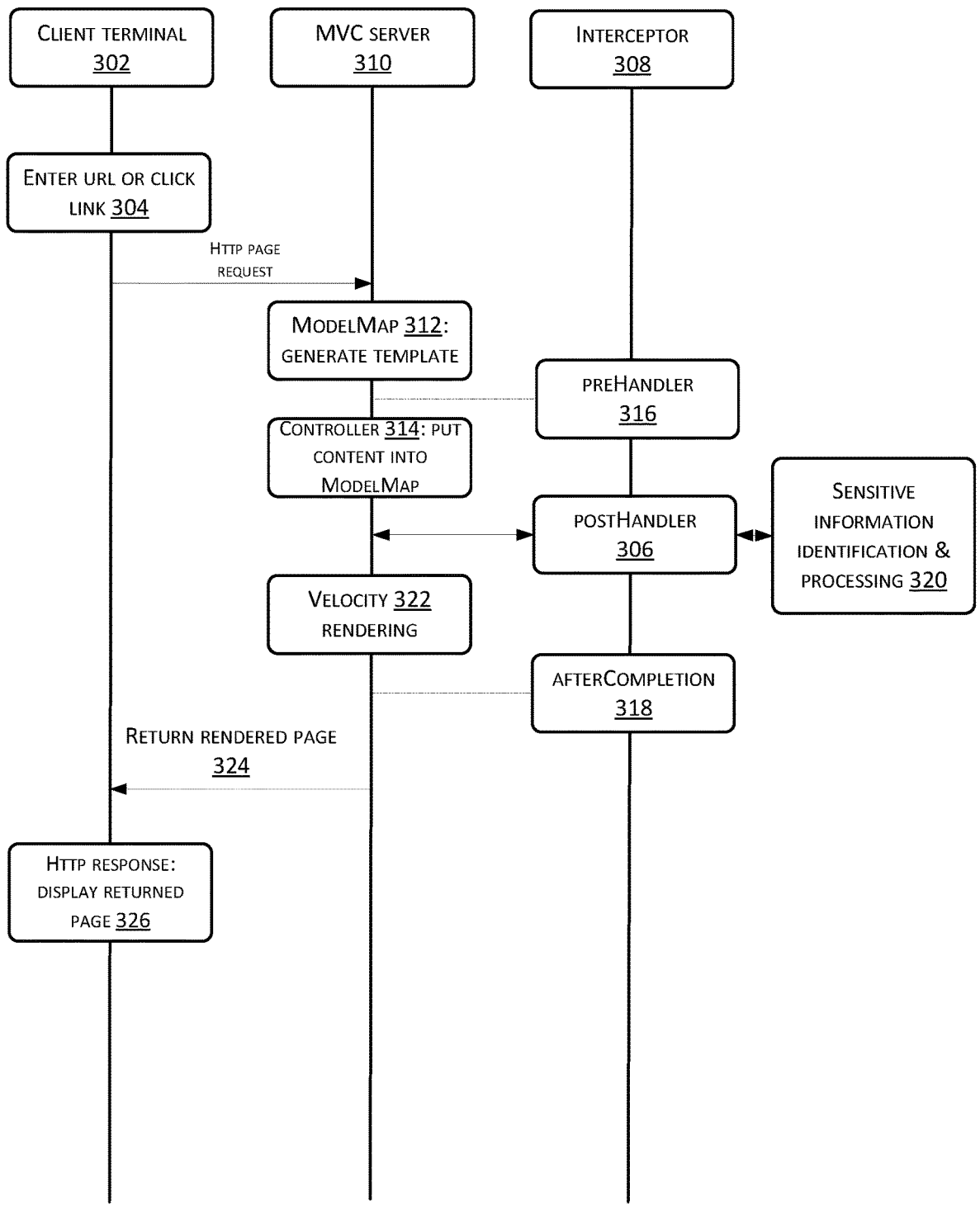
FIG. 3 is a flow chart of another example embodiment of the sensitive information processing method according to the present application.

In another example embodiment of the present application, FIG. 3 is a schematic flow chart of another example embodiment of the sensitive information processing method according to the present application.

As shown in FIG. 3, a client terminal 302 enters URL or clicks a link 304 at a page.

As shown in FIG. 3, in the sensitive information processing method, the acquiring to-be-processed information in a page may include acquiring variable information in an MVC framework by using a postHandle 306 processing program of an interceptor 308 and using the acquired variable information as the to-be-processed information. Specifically, this may include:

In a Controller phase of the MVC framework, the page server such as a MVC server 310 puts variable information, in the form of (variable name: value), into a variable in the ModelMap 312. After finishing putting variable information into all variables in the ModelMap by Controller 314, the MVC framework may send ModelMap data to the interceptor 308, and the postHandle processing program 306 of the interceptor 308 receives the ModelMap data sent by the MVC framework. The postHandle processing program may traverse the variable information in the ModelMap to acquire the variables in the ModelMap, and use the acquired variable information as the to-be-processed information.

The interceptor may be generally used for intercepting an access source before an execution step or a field of an application is accessed, and may perform a particular processing step before, preHandler 316, or after the interception, afterCompletion 318. In the MVC framework structure, the interceptor 308 may include three processing methods:

preHandle( )—which is invoked before the Controller 314 is invoked, and may be used for an initialization operation or preprocessing a request;

postHandle( )—which is invoked after the Controller 314 is invoked and before a view is rendered, and may be used for processing model data or the view, such as in coordination with sensitive information identification & processing 320; and afterCompletion( )—which is invoked after the view is presented, and may be used for cleaning up resources.

Generally, the processing methods of the interceptor may be implemented by corresponding processing units, for example, the preHandle processing phase may be implemented by a physical device preHandler of the interceptor, and certainly, the postHandle processing phase may be implemented by a physical device postHandler 306 of the interceptor.

As shown in FIG. 3, generally in the preHandle phase, no data has been put into the ModelMap, and therefore, the to-be-processed information, namely, the variable information in the ModelMap in the MVC framework structure in this example embodiment, can be acquired in the postHandle or afterCompletion phase. In this example embodiment, an example manner is as follows: after the Controller in the MVC framework structure is invoked and before the view is rendered, the to-be-processed information in the page may be acquired by using the interceptor, to intervene in sensitive information discrimination processing. Specifically, in this example embodiment, after variable data is put into the ModelMap, the postHandle processing program of the interceptor may acquire the variable information in the ModelMap. Certainly, the to-be-processed information in the page may also be acquired by using the interceptor after rendering (Velocity 322) in the MVC framework structure is invoked, that is, the to-be-processed information is acquired in the afterCompletion phase of the interceptor.

It should be noted that, in this example embodiment, the method of acquiring and subsequently modifying the variable information in the ModelMap by using the interceptor is applicable to other framework structures based on the MVC framework, such as a webx framework structure. There may be different interceptors for different page server frameworks. In this example embodiment, in the framework structure based on the MVC, the to-be-processed information may be acquired and processed by the corresponding interceptor before the page rendering (Velocity 322) and after the Controller 314 is invoked, or the to-be-processed information may also be acquired and processed by the corresponding interceptor after the page rendering (Velocity 322). An example implementation is to acquire and process the to-be-processed information by the corresponding interceptor before the page rendering (Velocity 322) and after the Controller 314 is invoked.

The variable information in the ModelMap in the MVC framework structure of the page server is acquired, and the variable information is used as the to-be-processed information in the page.

The rendered page 324 is returned to the client terminal 302. The http response 326 at the client terminal 302 is to display the returned page.

S2: It is determined whether the to-be-processed information is sensitive information according to a preset sensitive information identification strategy.

The sensitive information identification strategy may be a set of preset discrimination rules or methods for determining whether the acquired to-be-processed information is sensitive information. For example, when the to-be-processed information is variable information in the ModelMap in the MVC framework structure of the page server, the sensitive information identification strategy may include a sensitive information library that store sensitive information. The determining whether the to-be-processed information is sensitive information according to a preset sensitive information identification strategy may include:

At a first step: A variable name of the variable information in the ModelMap in the MVC framework structure of the page server is acquired.

At a second step: The acquired variable name of the variable information in the ModelMap is compared with sensitive information stored in a sensitive information library, to determine whether the variable name is in the sensitive information library.

At a third step: It is determined whether the to-be-processed information is sensitive information according to the determination result of whether the variable name is in the sensitive information library.

In this example embodiment, a sensitive information library including predefined sensitive information may be set. For example, a user name, a phone number, an email, and identity card number information of a user may be predefined as sensitive information, and their corresponding variable names (keys) "User", "Tel_Num", "E-Mail", and "ID_Num" in the ModelMap may be pre-stored in the sensitive information library. After the variable name of the variable information in the ModelMap is acquired, the acquired variable name may be compared with the sensitive information stored in the sensitive information library. If the sensitive information library includes sensitive information the same as the acquired variable name, it may indicate that the to-be-processed information is sensitive information, i.e., it may indicate that the variable information in the ModelMap corresponding to the variable name is sensitive information in this example embodiment; if the comparison result is that the sensitive information library does not include sensitive information the same as the acquired variable name, it may indicate that the to-be-processed information is not sensitive information, i.e., it may indicate that the variable information in the ModelMap corresponding to the variable name is not sensitive information in this example embodiment.

The sensitive information stored in the sensitive information library may be added, deleted, or modified as required.

Certainly, when the framework structure of the page server is of another framework mode, the acquired to-be-processed information may be of another data format corresponding to the framework structure of the server, and the sensitive information identification strategy may also be correspondingly set according to the to-be-processed information and the server framework, for example, it may be directly determined whether the whole data in the to-be-processed information is sensitive information or it may be determined, based on specified data, whether the to-be-encrypted information is sensitive information.

In the MVC-based framework structure in this example embodiment, it is determined whether the to-be-processed information is sensitive information according to the preset sensitive information identification strategy.

S3: When it is determined that the to-be-processed information is sensitive information, processing may be performed according to a preset sensitive information processing strategy, to form processed sensitive information.

When the determination result is that the to-be-processed information is sensitive information, the to-be-processed information may be processed according to the preset sensitive information processing strategy. The sensitive information processing strategy may include a set of preset rules or methods for processing the to-be-processed information determined as sensitive information. In this example embodiment, when the to-be-processed information is of a data format of a variable (variable name: value) in the ModelMap, the performing processing according to a preset sensitive information processing strategy may include processing a value corresponding to the variable name in the variable information. Specifically, the sensitive information processing strategy may include at least one of the followings:

non-processing, display of a predetermined part, complete masking, privilege-based masking, display after transformation, and misinformation.

The non-processing may include not performing processing such as masking, transformation, and substitution on the value corresponding to the variable name, and the value corresponding to the variable name does not change.

The display of a predetermined part may include displaying a particular field of the value corresponding to the variable name according to a predetermined display rule. For example, when the to-be-processed information is (Tel_Num: 15912344321), the predetermined display rule may include substituting the fourth to eighth digits of the value corresponding to the variable name "Tel: Num" with characters "*". After the to-be-processed information (Tel_Num: 15912344321) is processed according to the foregoing processing strategy of displaying a predetermine field, processed sensitive information may be formed, which is (Tel_Num: 159*****321).

The complete masking may include masking all fields of the value corresponding to the variable name according to a predetermined masking rule. For example, a value corresponding to a variable name "Tel: Num" may be substituted with one or more characters "*", and formed processed sensitive information may be (Tel_Num: *) or (Tel_Num: ***********).

The privilege-based masking may include processing the value corresponding to the variable name according to a privilege of a specified field. For example, the known field is an acquired user name of a user of a client terminal, and corresponding processing methods may be set according to privileges of different domain groups to which the user name belongs. Specifically, as shown in Table 1 below, the sensitive information may be processed according to a received privilege of a user of a client terminal that sends an HTTP request. Specifically, for example, when a received user name for sending the HTTP request belongs to a super administrator domain group, it may be set that none of sensitive information is processed; when the user name for sending the HTTP request belongs to an administrator domain group, it may be set that specified sensitive information is partially masked; and when the user name for sending the HTTP request belongs to a user domain group, it may be set that specified sensitive information is completely masked or partially masked.

TABLE 1

Schematic Table of Privilege-based Masking Processing Strategy

| Variable name | Value | Domain group | Processing strategy | Value after processing |
| --- | --- | --- | --- | --- |
| Name1 | Zhang san | Super administrator | Non-processing | Zhang san |
| Name2 | Li si | Administrator | Partial display | Li* |
| Name3 | Wang wu | User | Masking | ** |
| Tel_Num | 15912344321 | User | Partial display | 159*****321 |
| E-Mail | user1@l63.com | User | Partial display | use**@163.com |
| ID_Num | 320322198708081234 | Administrator | Masking | 320**** |
| Add_ID | Hangzhou, Zhejiang Province | User | Partial display | Zhejiang Province |
| Gender | Female | User | Non-processing | Female |

The display after transformation may include transforming the value corresponding to the variable name according to a predetermined transformation rule, and using the transformed value as the value of the variable name. For example, the value "evil" of the fourth variable (Name4: evil) in the ModelMap is transformed into "live" according to the predetermined rule and then is used as the processed value of the fourth variable, that is, the processed sensitive information may be (Name4: live).

The misinformation may be expressed as performing no processing operation on the value corresponding to the variable name when a sensitive information identification rule is abnormal or the identified sensitive information does not conform to a sensitive information determination standard that is set according to another condition, and in this case, a misinformation log may be generated. The misinformation log may store and record the number of generated misinformation as well as a target source (such as an original variable name and value) of each misinformation, cause of misinformation, a log generation time, and the like. In this example embodiment, the generated misinformation log may be stored, and may be used for subsequent behavioral statistics.

During specific implementation, the sensitive information processing strategy may be set in a combined or nested manner as required. For example, the performing processing according to a preset sensitive information processing strategy may include:

setting sensitive information processing strategies for values corresponding to different variable names according to the different variable names in the variable information; or, setting in a same variable name of the variable information, according to a privilege of specified field information, a sensitive information processing strategy for a value corresponding to the same variable name.

In a specific example, a user name, a phone number, an email, and identity card number information of a user may be predefined as sensitive information, and their corresponding variable names (keys) in the ModelMap are "User", "Tel_Num", "E-Mail", and "ID_Num". During setting of the sensitive information processing strategy, in accordance with preset security levels of the sensitive information, only first two characters of a value corresponding to the variable name "User" of the user name may be displayed according to the processing strategy of displaying a predetermined part, while the rest are substituted with characters "*"; only the character "@" and characters after "@" in a value corresponding to the variable name "E-Mail" of the user's email are displayed according to the processing strategy of displaying a predetermined part. For the identity card number of the user, which is relatively important, all of the value corresponding to the variable name "ID_Num" of the identity card number may be substituted with 4 characters "*" according to the processing strategy of complete masking.

Certainly, in another implementation, in a same variable of the variable information, a sensitive information processing strategy may also be set for a value corresponding to the same variable name according to a preset privilege of specified field information. The specified field may include information about a particular field in the acquired page, for example, a user name of a user who sends an HTTP request. Specifically, for example, the sensitive information may be processed according to an acquired privilege of the user who sends the HTTP request. For example, when the user who sends the HTTP request has administrator privileges, the value corresponding to the variable name "Tel_Num" of the phone number of the user may not be processed, and the administrator can view complete phone number information in the finally returned page. If the user who sends the HTTP request is a regular member, only the first and last three phone number digits of the value corresponding to the variable name "Tel_Num" of the phone number of the user may be displayed according to the predetermined display rule, and the rest are substituted with characters "*".

When it is determined that the to-be-processed information is sensitive information, processing may be performed according to at least one preset sensitive information processing strategy, to form processed sensitive information.

S4: The corresponding to-be-processed information in the page is substituted with the processed sensitive information, to form a page with the processed sensitive information.

After the processed sensitive information is formed from the to-be-processed information acquired in the page, the processed sensitive information may be sent to a corresponding position of the corresponding to-be-processed information in the page, to substitute the original to-be-processed information in the page. For example, in this example embodiment, after the value corresponding to the variable name is substituted according to the sensitive information processing strategy, a variable after the value substation may be returned to the ModelMap in the MVC server framework structure, and the page is rendered by using the variable after the value substitution in the MVC framework. Specifically, for example, during rendering of a VM page template, a value in variable information, whose variable name is the same as the variable name of the processed sensitive information, among variable information in the ModelMap may be substituted with a value corresponding to the variable name in the processed sensitive information. For example, the value "Li si" of the variable (Name2: Li si) in the ModelMap may be substituted with the value "Li*" of the processed sensitive information (Name2: Li*). Certainly, when it is determined that the to-be-encrypted information is not sensitive information or the processing strategy for the sensitive information is non-processing or misinformation, the to-be-encrypted information may not need to be processed. Specifically, in this example embodiment, the value of the variable in the ModelMap may not be substituted.

After the page is rendered by using the processed sensitive information to form a page with the processed sensitive information, the page with the processed sensitive information may be returned to the browser of the client terminal. After receiving the page with the processed sensitive information, the client terminal displays the page with the processed sensitive information to the user. For example, in a module display area for displaying a current login user name, the user name "Li si" is originally displayed, and after the sensitive information is processed, a user name displayed to the user of the client terminal may be "Li*".

In the sensitive information processing method provided by this example embodiment, to-be-processed information may be acquired at a page server terminal, and it is determined whether the to-be-processed information is sensitive information according to a preset sensitive information identification strategy. When the to-be-processed information is sensitive information, the sensitive information may be processed according to a preset sensitive information processing strategy, and then the processed sensitive information is returned to the page, so that a page with the processed sensitive information can be formed. The sensitive information included in the page with the processed sensitive information is information that has been correspondingly processed on the server terminal, and an illegal user of a client terminal cannot acquire the real sensitive information in the page even by capturing data packets or deleting a JavaScript script; in this way, the security of the sensitive information in the page is improved An HTTP request page sent by the user of the client terminal may include multiple pieces of sensitive information to be identified and processed, and these pieces of sensitive information may appear at different locations in different request pages, and may also correspond to different variables in the ModelMap of the MVC framework structure, which increases the difficulty of identifying sensitive information in subsequent sensitive information processing. Different MVC framework-based page servers or different design and development personnel may set different variable names in the ModelMap for same sensitive information such as an email or an identity card number of the user. For example, in the ModelMap of one page request, a variable name corresponding to the identity card number variable information is "ID_Num", while in another page request, a variable name corresponding to the identity card number variable information may be "Num_001" in the ModelMap. The present application provides another example embodiment of a dynamic sensitive information processing method, and in this example embodiment, the sensitive information identification strategy can be dynamically adjusted according to a preset sensitive information monitoring strategy. Specifically, the sensitive information processing method may further include:

S5: It is determined, according to a preset sensitive information monitoring strategy, whether a value of the variable information in the ModelMap in the MVC framework structure of the page server is to-be-processed sensitive information.

S6: A variable name corresponding to the value of the variable information is sent to the sensitive information library when it is determined, according to the sensitive information monitoring strategy, that the value of the variable information is to-be-processed sensitive information.

In this example embodiment, it may be determined, according to the preset sensitive information monitoring strategy, whether the value of the variable information in the ModelMap is to-be-processed sensitive information. In a specific implementation application, the sensitive information generally has a particular data structure format, for example, a mobile phone number generally may be a combination of 11 digits starting with a non-zero digit, an email generally may include the character "@". In this case, the sensitive information monitoring strategy may determine, by means of regular matching, whether the value of the variable information in the ModelMap conforms to the preset number combination of 11 digits, or determine whether the value of the variable information in the ModelMap includes the character "@" and whether there is at least one non-null character in front of "@", or the like. If it is determined, according to the sensitive information monitoring strategy, that the value of the variable information in the ModelMap is to-be-processed sensitive information, a variable name "Phone_Num" or "First_Contact" corresponding to the value of the variable information may be sent to the sensitive information library. The sensitive information library may receive the variable name "Phone_Num" or "First_Contact" corresponding to the value of the variable information, and compare to see whether the sensitive information library has stored sensitive information the same as the variable name. If there is no sensitive information the same as the variable name in the sensitive information library, the variable name, which is not included in the sensitive information library but the value corresponding to which is the to-be-processed sensitive information, may be stored into the sensitive information library as newly-added sensitive information. In this way, if the newly-added sensitive information "Phone_Num" or "First_Contact" is not stored in the sensitive information library currently, by means of the sensitive information monitoring strategy, the to-be-processed sensitive information whose variable name is "Phone_Num" or "First_Contact" may be added to the sensitive information library as newly-added sensitive information. Next time an HTTP request of the user is responded to, sensitive information whose variable name is "Phone_Num" or "First_Contact" may be identified, and the value corresponding to the variable name "Phone_Num" or "First Contact" may be processed according to the sensitive information processing strategy.

Corresponding to the to-be-processed sensitive information identified in S5 above, a corresponding to-be-processed sensitive information log may further be generated. The to-be-processed sensitive information log may include the number of the to-be-processed sensitive information, a value of the to-be-processed sensitive information, a variable name corresponding to the value, whether the to-be-processed sensitive information has been sent to the sensitive information library, a processing time of each piece of the to-be-processed sensitive information, a generation time of the to-be-processed sensitive information log, and the like, which can be used for data processing during subsequent system security determination.

Corresponding to the newly-added sensitive information stored in the sensitive information library, a corresponding newly-added sensitive information log may further be generated. The newly-added sensitive information log may include the number of the newly-added sensitive information, a value of the newly-added sensitive information, a variable name corresponding to the value, whether the newly-added sensitive information has been stored in the sensitive information library as well as a storage time, a generation time of the newly-added sensitive information log, and the like, which can be used for data processing during subsequent system security determination.

A sensitive information processing method including a sensitive information monitoring strategy of the present application can implement dynamic update of a sensitive information library, and can more accurately identify sensitive information in to-be-processed information, complete processing the sensitive information, and improve the security of sensitive information in a page.

Figure 4:
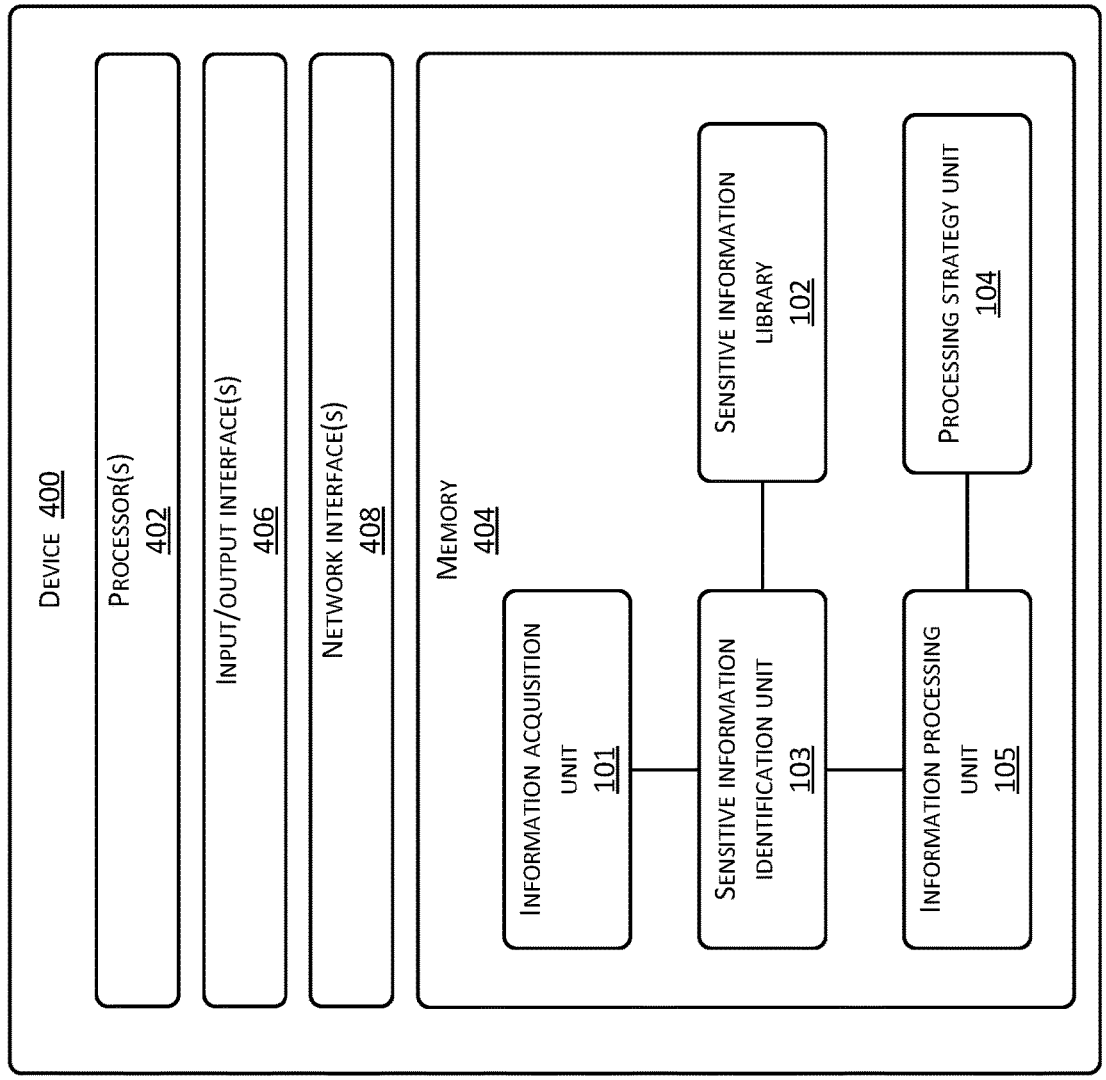
FIG. 4 is a modular schematic structural diagram of an example embodiment of a device for implementing sensitive information processing according to the present application.

Based on the idea of the present application, the present application provides a device for implementing sensitive information processing. FIG. 4 is a modular schematic structural diagram of an example embodiment of a device for implementing sensitive information processing according to the present application. As shown in FIG. 4, a device 400 includes one or more processor(s) 402 or data processing unit(s) and memory 404. The device 400 may further include one or more input/output interface(s) 406, and network interface(s) 408. The memory 404 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 404 may store therein a plurality of modules or units including:

an information acquisition unit 101, which acquires to-be-processed information in a page;

a sensitive information library 102, which stores sensitive information;

a sensitive information identification unit 103, which determines whether the to-be-processed information is sensitive information on the basis of the sensitive information stored in the sensitive information library 102;

a processing strategy unit 104, which stores a sensitive information processing strategy;

an information processing unit 105, which processes, when the sensitive information identification unit 103 determines that the to-be-processed information is sensitive information, the to-be-processed information on the basis of the sensitive information processing strategy stored by the processing strategy unit 104, to form processed sensitive information.

In a specific example embodiment, the to-be-processed information acquired by the information acquisition unit 101 may include:

variable information in a ModelMap in an MVC framework structure of a page server.

During specific processing, the sensitive information processing strategy stored by the processing strategy unit 104 may include:

sensitive information processing strategies that are set for values corresponding to different variable names according to the different variable names in the variable information; or, sensitive information processing strategies, which are set for a same variable name of the variable information according to a privilege of specified field information, for a value corresponding to the same variable name.

Figure 5:
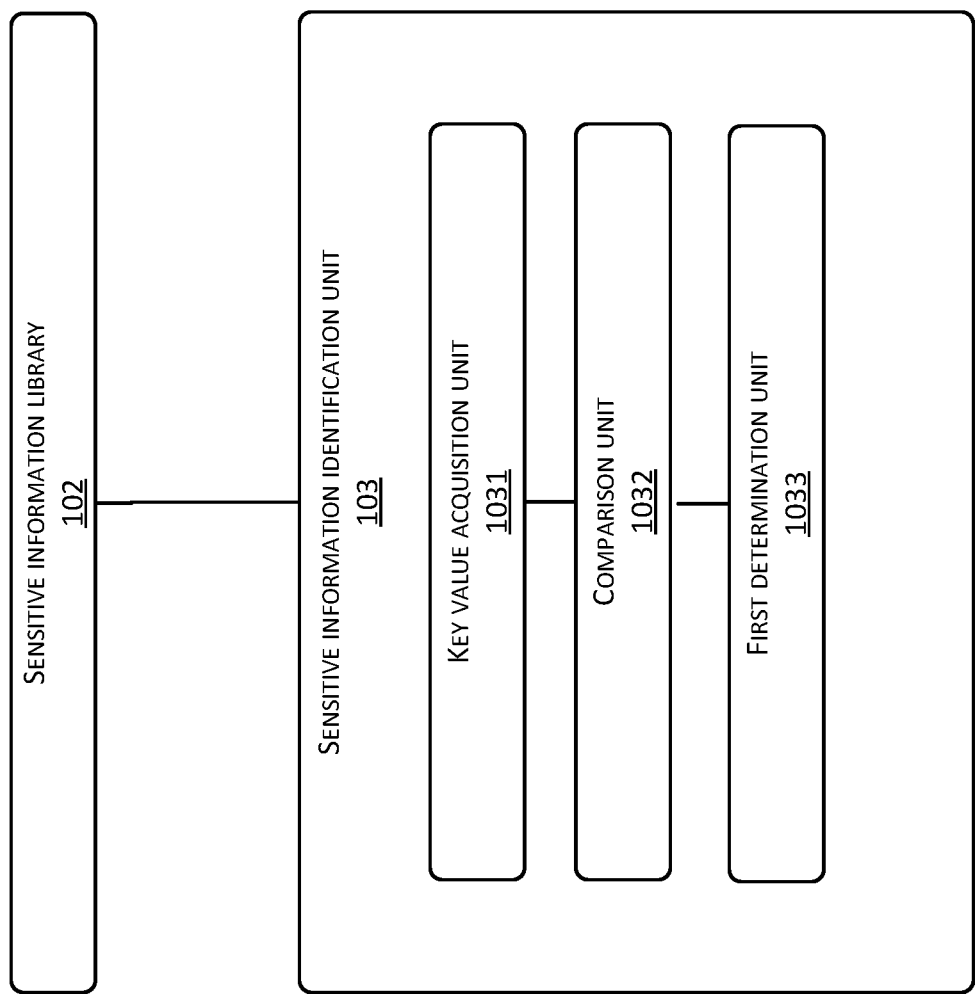
FIG. 5 is a modular schematic structural diagram of a sensitive information identification unit in the device for implementing sensitive information processing according to the present application.

FIG. 5 is a modular schematic structural diagram of an example embodiment of the sensitive information identification unit 103 in the device for implementing sensitive information processing according to the present application. As shown in FIG. 5, the sensitive information identification unit 103 may include:

a key value acquisition unit 1031, which acquires a variable name of the variable information in the ModelMap in the MVC framework structure of the page server;

a comparison unit 1032, which compares whether the acquired variable name of the variable information in the ModelMap is the same as the sensitive information stored in the sensitive information library 102; and a first determination unit 1033, which determines whether the to-be-processed information is sensitive information according to the comparison result of the comparison unit 1032.

In the foregoing first determination unit 1033, if the comparison result of the comparison unit 1032 is that the variable name is the same as the sensitive information stored in the sensitive information library 102, the first determination unit 1033 determines that the to-be-processed information acquired by the information acquisition unit 101 is sensitive information; correspondingly. If the comparison unit 1032 does not find sensitive information the same as the variable name after traversing the sensitive information stored in the sensitive information library 102, the comparison result is that the variable name is not the same, and in this case, the first determination unit 1033 determines that the to-be-processed information acquired by the information acquisition unit 101 is not sensitive information.

Figure 6:
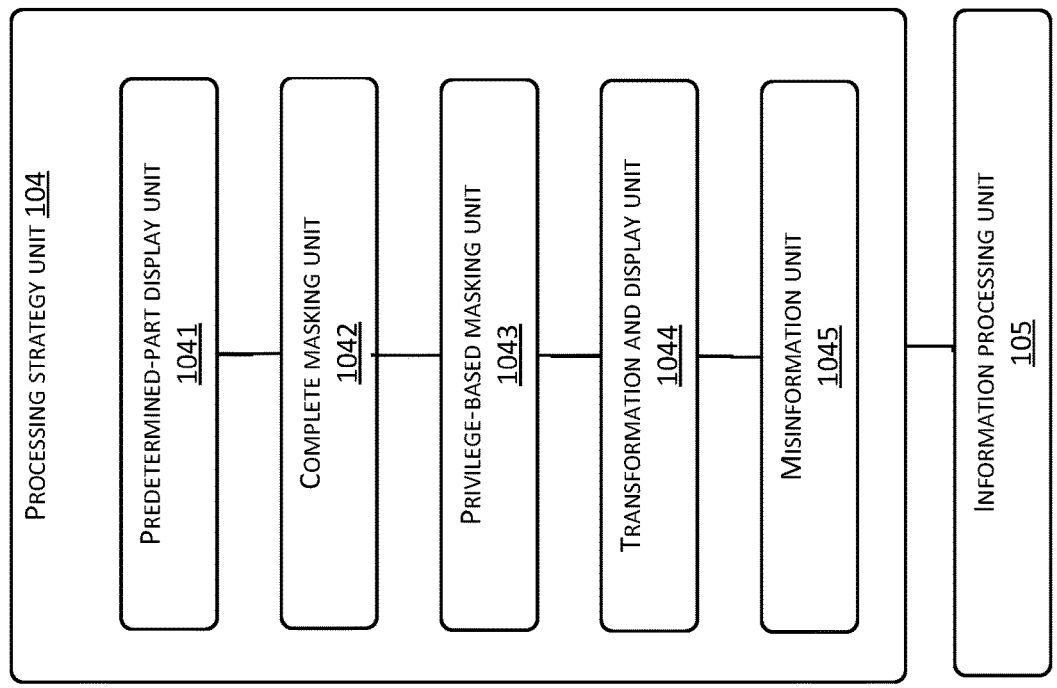
FIG. 6 is a modular schematic structural diagram of a processing strategy unit in the device for implementing sensitive information processing according to the present application.

FIG. 6 is a modular schematic structural diagram of an example embodiment of the processing strategy unit in the device for implementing sensitive information processing according to the present application. As shown in FIG. 6, the processing strategy unit 104 may include at least one of the following units:

a predetermined-part display unit 1041, which displays a particular field of a value corresponding to the variable name according to a predetermined display rule;

a complete-masking unit 1042, which masks all fields of the value corresponding to the variable name according to a predetermined masking rule;

a privilege-based masking unit 1043, which processes the value corresponding to the variable name according to a privilege of a specified field; specifically, for example, it may be set for a high-privileged user that specified sensitive information is not masked or is partially masked, and it is set for a low-privileged user that specified sensitive information is partially masked or completely masked;

a transformation and display unit 1044, which transforms the value corresponding to the variable name according to a predetermined transformation rule, and uses the transformed value as the value of the variable name; and a misinformation unit 1045, which skips processing the value corresponding to the variable name when any one of the structural modules in the sensitive information processing device is abnormal or the sensitive information identified by the sensitive information identification unit 103 does not conform to a sensitive information determination standard set by a third-party module, and generates a misinformation log. Setting of the third-party module may include another module, which is set inside or outside the sensitive information processing device, for determining whether the to-be-processed information is sensitive information. If the sensitive information identification method of the device for implementing sensitive information processing in this example embodiment is contradictory with a sensitive information identification method of another module, the sensitive information herein may be set as misinformation, and data processing may not be performed on the sensitive information. For example, it is determined, according to the character "@" included in the value corresponding to the variable name, that the corresponding to-be-processed information is sensitive information: an email of the user, and meanwhile, it may be determined according to the third-party module that the corresponding to-be-processed information is comments on a seller entered by the user in a textbox, rather than set sensitive information. In this case, the misinformation unit 1045 of the sensitive information processing device may not perform processing such as masking or transformation on the to-be-processed information, and may record a log of the current misinformation.

The device for implementing sensitive information processing in this example embodiment may obtain to-be-processed information in a page, and determine whether the to-be-processed information is sensitive information according to a preset sensitive information identification strategy. If yes, the device may process the to-be-processed information according to a preset sensitive information processing strategy, to complete identification and processing of the sensitive information.

In another example embodiment of the present application, the device for implementing sensitive information processing may further include a unit for maintaining the sensitive information in the sensitive information library.

Figure 7:
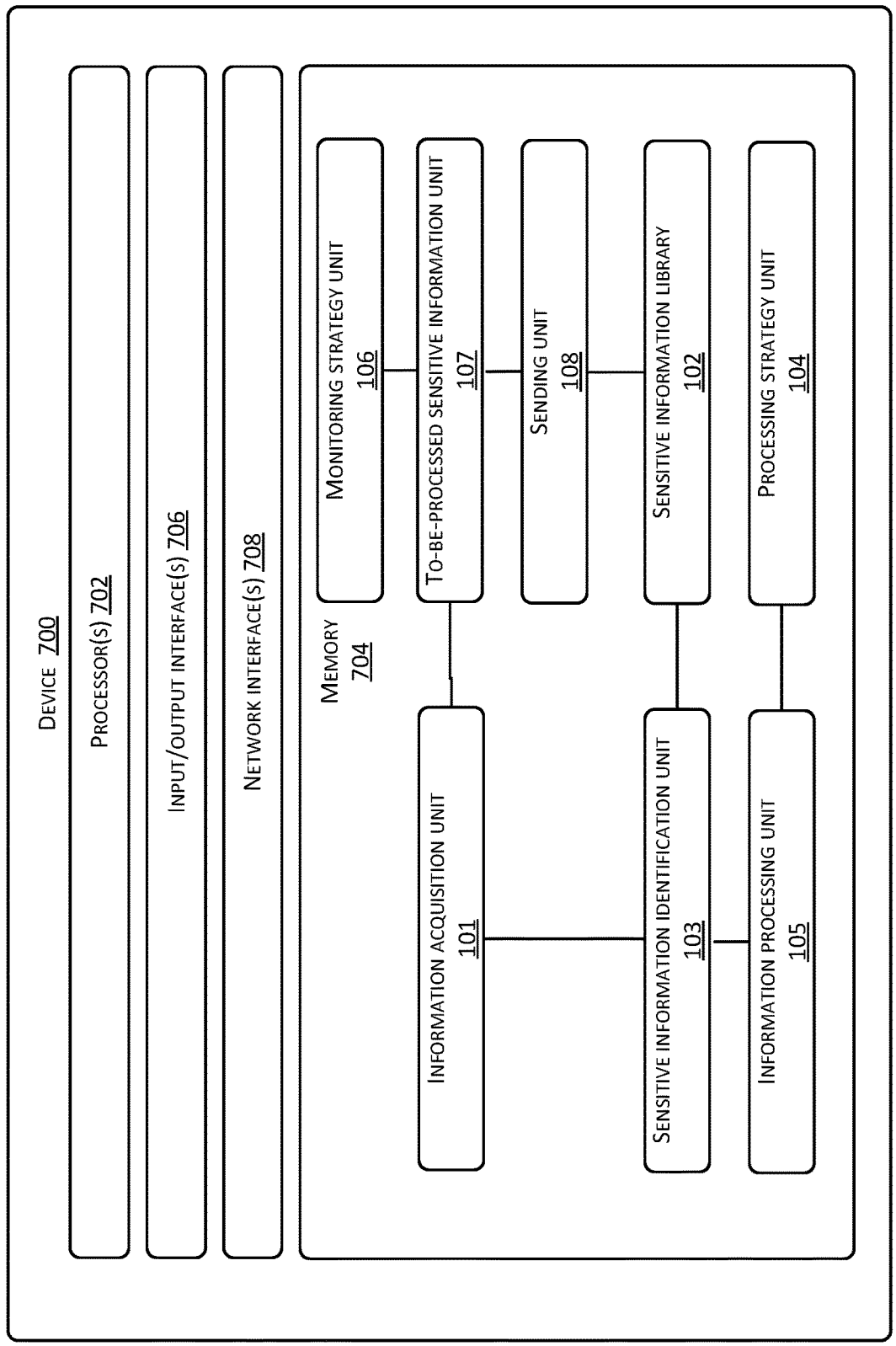
FIG. 7 is a modular schematic structural diagram of another example embodiment of the device for implementing sensitive information processing according to the present application.

FIG. 7 is a modular schematic structural diagram of another example embodiment of the device for implementing sensitive information processing according to the present application. As shown in FIG. 7, a device 700 includes one or more processor(s) 702 or data processing unit(s) and memory 704. The device 700 may further include one or more input/output interface(s) 706, and network interface(s) 708. The memory 704 is an example of computer readable media.

The memory 704 may store therein a plurality of modules or units including:

an information acquisition unit 101, which acquires to-be-processed information in a page;

a sensitive information library 102, which stores sensitive information;

a sensitive information identification unit 103, which determines whether the to-be-processed information is sensitive information on the basis of the sensitive information stored in the sensitive information library 102;

a processing strategy unit 104, which stores a sensitive information processing strategy;

an information processing unit 105, which processes, when the sensitive information identification unit 103 determines that the to-be-processed information is sensitive information, the to-be-processed information on the basis of the sensitive information processing strategy stored by the processing strategy unit 104, to form processed sensitive information;

a monitoring strategy unit 106, which stores a preset sensitive information monitoring strategy;

a to-be-processed sensitive information unit 107, which determines, according to the preset sensitive information monitoring strategy, whether a value of the variable information in the ModelMap in the MVC framework structure of the page server is to-be-processed sensitive information; and a sending unit 108, which sends a variable name corresponding to the value of the variable information to the sensitive information library 102 when the to-be-processed sensitive information unit 107 determines that the value of the variable information is to-be-processed sensitive information.

Correspondingly, the sensitive information library 102 receives the variable name corresponding to the value of the variable information, and compares to see whether sensitive information the same as the variable name is stored in the sensitive information library 102. If there is no sensitive information the same as the variable name in the sensitive information library 102, the variable name may be stored.

Figure 8:
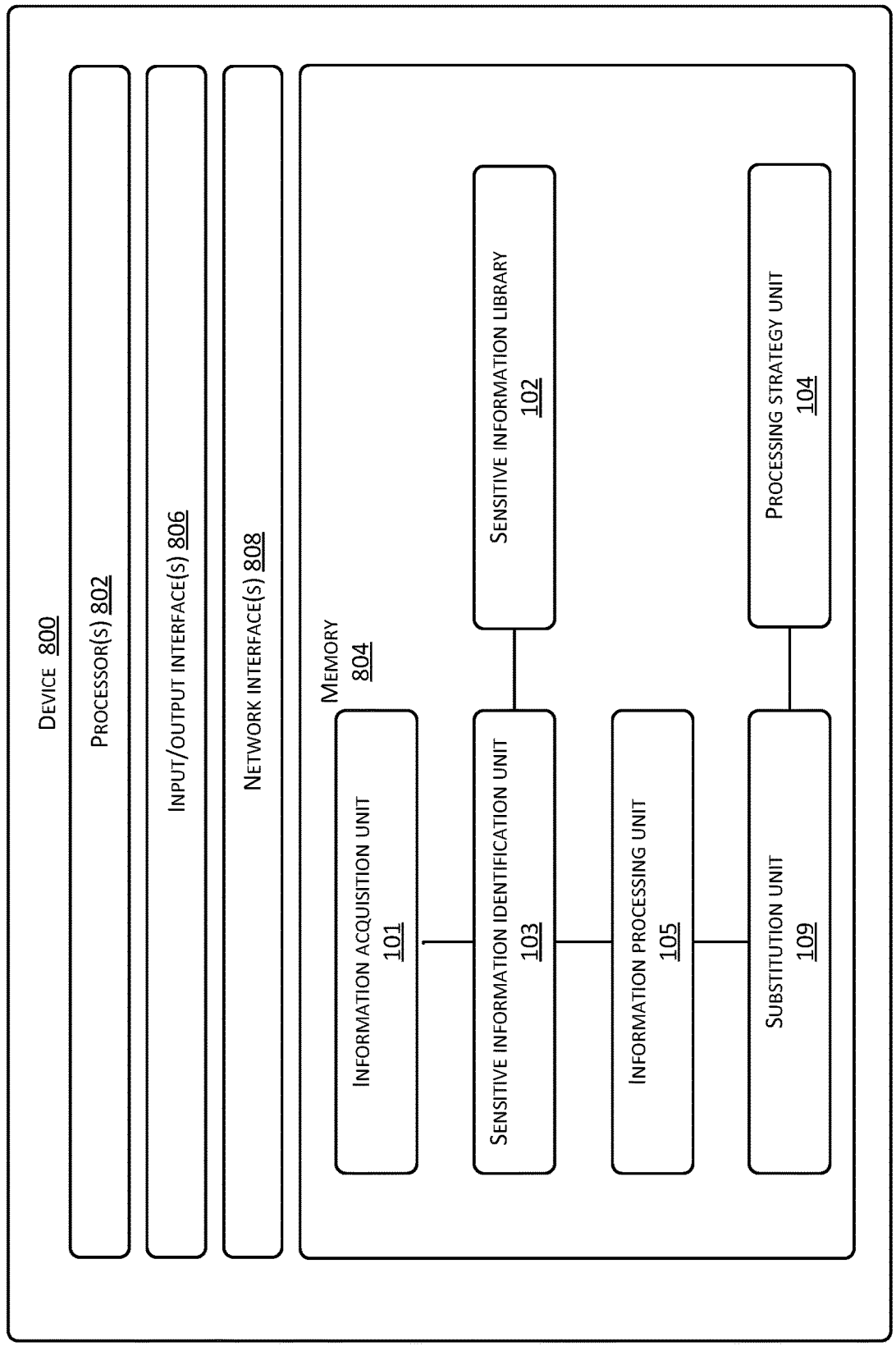
FIG. 8 is a modular schematic structural diagram of another example embodiment of the device for implementing sensitive information processing according to the present application.

FIG. 8 is another example embodiment of the device for implementing sensitive information processing according to the present application. As shown in FIG. 8, a device 800 includes one or more processor(s) 802 or data processing unit(s) and memory 804. The device 800 may further include one or more input/output interface(s) 806, and network interface(s) 808. The memory 804 is an example of computer readable media.

The memory 804 may store therein a plurality of modules or units including:

an information acquisition unit 101, which acquires to-be-processed information in a page;

a sensitive information library 102, which stores sensitive information;

a sensitive information identification unit 103, which determines whether the to-be-processed information is sensitive information on the basis of the sensitive information stored in the sensitive information library 102;

a processing strategy unit 104, which stores a sensitive information processing strategy;

an information processing unit 105, which processes, when the sensitive information identification unit 103 determines that the to-be-processed information is sensitive information, the to-be-processed information on the basis of the sensitive information processing strategy stored by the processing strategy unit 104, to form processed sensitive information;

a substitution unit 109, which substitutes the corresponding to-be-processed information in the page with the processed sensitive information.

Figure 9:
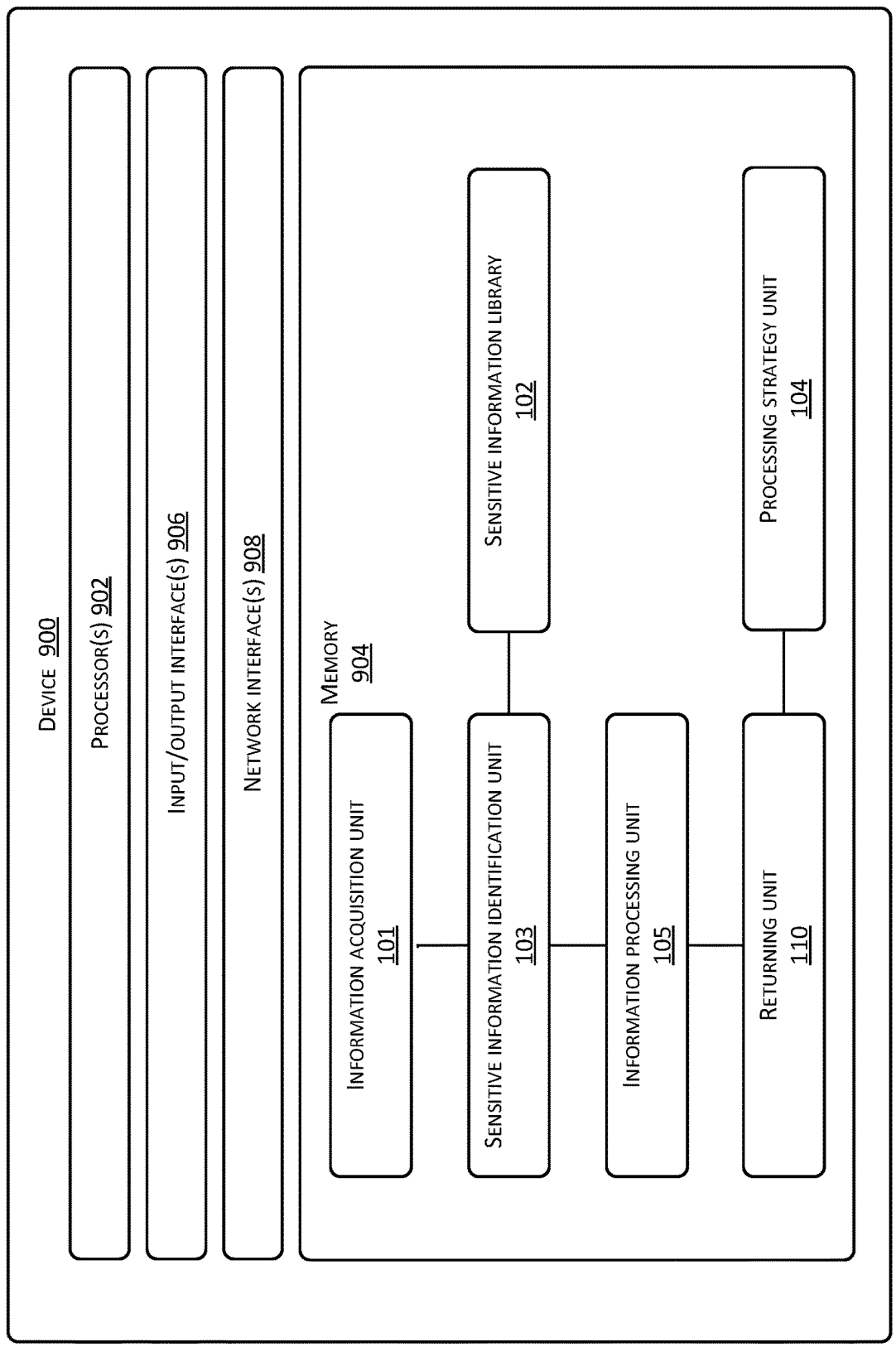
FIG. 9 is a modular schematic structural diagram of another example embodiment of the device for implementing sensitive information processing according to the present application.

In this example embodiment, the device for implementing sensitive information processing substitutes, in the device, the corresponding to-be-processed information in the page with the processed sensitive information. In another implementation, the processed sensitive information is sent to the server, and the server substitutes the corresponding to-be-processed information in the page with the processed sensitive information, to form a page with the processed sensitive information. FIG. 9 is another example embodiment of the device for implementing sensitive information processing according to the present application, and as shown in FIG. 9, a device 900 includes one or more processor(s) 902 or data processing unit(s) and memory 904. The device 900 may further include one or more input/output interface(s) 906, and network interface(s) 908. The memory 904 is an example of computer readable media.

The memory 904 may store therein a plurality of modules or units including:

an information acquisition unit 101, which acquires to-be-processed information in a page;

a sensitive information library 102, which stores sensitive information;

a sensitive information identification unit 103, which determines whether the to-be-processed information is sensitive information on the basis of the sensitive information stored in the sensitive information library 102;

a processing strategy unit 104, which stores a sensitive information processing strategy;

an information processing unit 105, which processes, when the sensitive information identification unit 103 determines that the to-be-processed information is sensitive information, the to-be-processed information on the basis of the sensitive information processing strategy stored by the processing strategy unit 104, to form processed sensitive information;

a returning unit 110, which directly sends the processed sensitive information to a server or to a processed sensitive information receiving unit of the server by using an interceptor.

The present application further provides a server for implementing sensitive information processing, and the server may include any one of the devices for implementing sensitive information processing described above.

Without using an interceptor, the server for implementing sensitive information processing provided by the present application may include:

a first MVC target system, which receives an HTTP request sent by a client terminal, and generates a page template ModelMap according to the HTTP request; transmits to-be-processed information into the generated page template ModelMap, and completes rendering of a page corresponding to the HTTP request; sends the rendered page to the client terminal; receives processed sensitive information sent by a sensitive information processing module, and substitutes the corresponding to-be-processed information in the page template ModelMap with the processed sensitive information;

a first sensitive information processing module, which acquires to-be-processed information in the page template ModelMap, and determines whether the to-be-processed information is sensitive information according to a preset sensitive information identification strategy; performs processing according to a preset sensitive information processing strategy when the to-be-processed information is sensitive information, to form processed sensitive information; and sends the processed sensitive information to the MVC target system.

Figure 10:
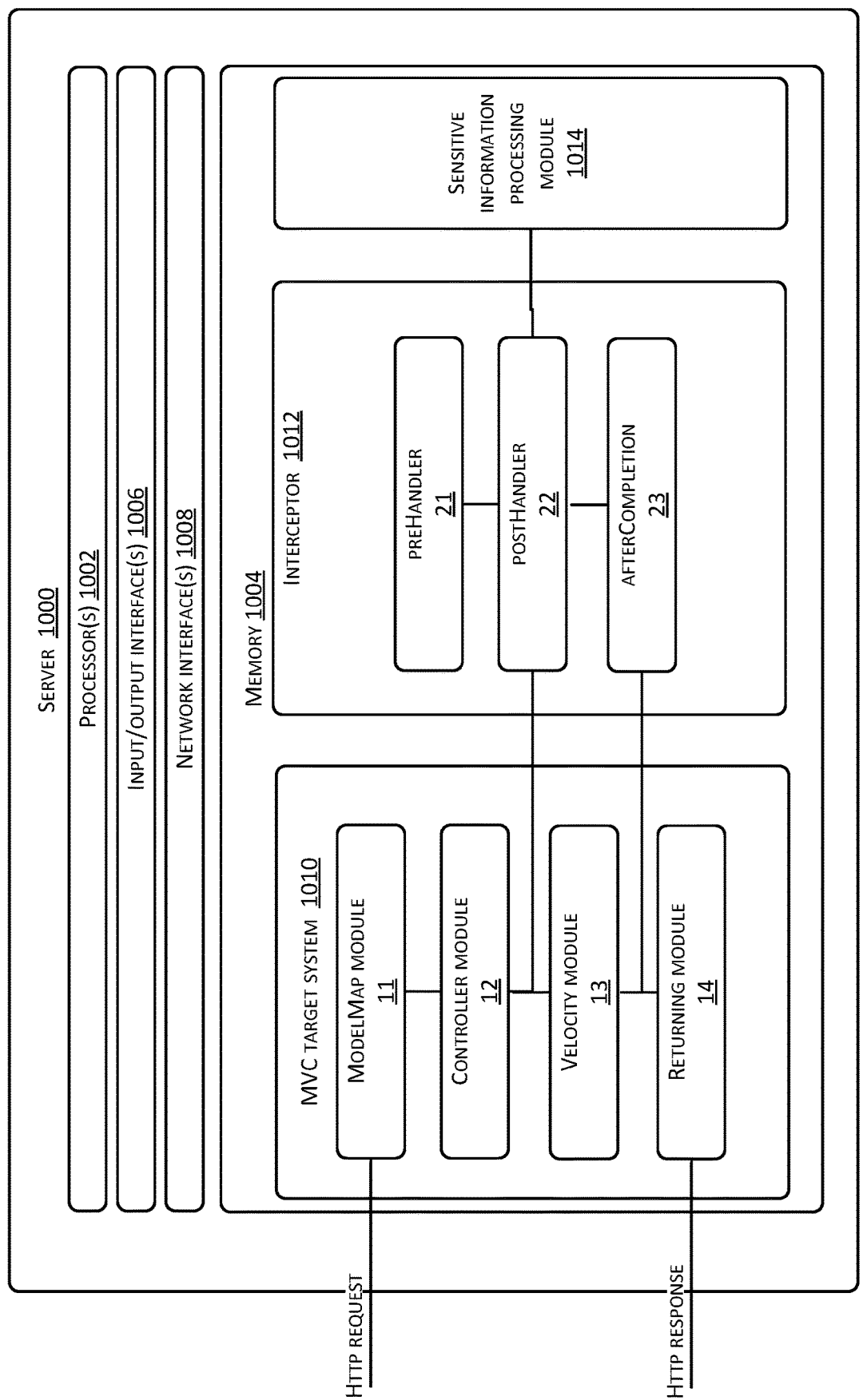
FIG. 10 is a modular schematic structural diagram of another example embodiment of the server for implementing sensitive information processing according to the present application.

FIG. 10 is a modular schematic structural diagram of another example embodiment of a server 1000 for implementing sensitive information processing according to the present application. The server 1000 may include an MVC framework structure. The server 1000 for implementing sensitive information processing in the present application may include any one of the foregoing devices for implementing sensitive information processing, and may include an interceptor in an example implementation. Specifically, as shown in FIG. 10, the server 1000 may include one or more processor(s) 1002 or data processing unit(s) and memory 1004. The server 1000 may further include one or more input/output interface(s) 1006, and network interface(s) 1008. The memory 1004 is an example of computer readable media.

The memory 1004 may store therein a plurality of modules or units including:

an MVC target system 1010, which receives an HTTP request sent by a client terminal, and generate a page template ModelMap according to the HTTP request; transmits to-be-processed information into the generated page template ModelMap, and completes rendering of a page corresponding to the HTTP request; sends the rendered page to the client terminal; and receives processed sensitive information sent by a sensitive information processing module, and substitutes the corresponding to-be-processed information in the page template ModelMap with the processed sensitive information;

an interceptor 1012, which acquires to-be-processed information in the page template ModelMap, sends the to-be-processed information to the sensitive information processing module 1014; and receives processed sensitive information sent by the sensitive information processing module 1014, and sends the processed sensitive information to the MVC target system 1010; and the sensitive information processing module 1014, which receives the to-be-processed information and determine whether the to-be-processed information is sensitive information; and processes the to-be-processed information, which is determined as sensitive information according to a preset sensitive information processing strategy, to form processed sensitive information. The sensitive information processing module 1014 may include:

an information receiving unit, which receives to-be-processed information;

a first sensitive information library, which stores sensitive information;

a first sensitive information identification unit, which determines, on the basis of the sensitive information stored in the first sensitive information library, whether the to-be-processed information is sensitive information;

a first processing strategy unit, which stores the sensitive information processing strategy;

a first information processing unit, which processes, when the first sensitive information identification unit determines that the to-be-processed information is sensitive information, the to-be-processed information on the basis of the sensitive information processing strategy stored by the first processing strategy unit, to form processed sensitive information; and a first returning unit, which sends the processed sensitive information to the interceptor.

The foregoing MVC target system 1010 may specifically include:

a ModelMap module, which receives an HTTP request sent by a client terminal, and generate a page template ModelMap according to the HTTP request;

a Controller module, which transmits to-be-processed information into the generated page template ModelMap; and receives processed sensitive information sent by an interceptor;

a Velocity module, which substitutes the corresponding to-be-processed information in the page template ModelMap with the processed sensitive information received by the Controller module; and completes rendering of a page corresponding to the HTTP request; and a returning module, which sends the rendered page to the client terminal.

The interceptor 1012 generally may include a preHandler (21), a postHandler (22), and an afterCompletion (23). In the server for implementing sensitive information processing of the present application, the acquiring, by the interceptor 2, to-be-processed information in the page template ModelMap may include:

acquiring the to-be-processed information in the page template ModelMap by using a postHandle or afterCompletion processing program of the interceptor.

In the MVC target system, the to-be-processed information may include variable information in the ModelMap.

In the foregoing server for implementing sensitive information processing, the first processing strategy unit includes at least one of the following units:

a first predetermined-part display unit, which displays a particular field of a value corresponding to the variable name according to a predetermined display rule;

a first complete-masking unit, which masks all fields of the value corresponding to the variable name according to a predetermined masking rule;

a first privilege-based masking unit, which processes the value corresponding to the variable name according to a privilege of a specified field;

a first transformation and display unit, which transforms the value corresponding to the variable name according to a predetermined transformation rule, and use the transformed value as the value of the variable name; and a first misinformation unit, which skips processing the value corresponding to the variable name when any one of the structural modules in the sensitive information processing device is abnormal or the sensitive information identified by the sensitive information identification unit does not conform to a sensitive information determination standard set by a third-party module, and generate a misinformation log.

In the foregoing server for implementing sensitive information processing, the first sensitive information identification unit includes:

a first key value acquisition unit, which acquires a variable name of variable information in the ModelMap in the MVC target system;

a first comparison unit, which compares whether the acquired variable name of the variable information in the ModelMap is the same as the sensitive information stored in the first sensitive information library; and a second determination unit, which determines whether the to-be-processed information is sensitive information according to the comparison result of the first comparison unit.

In an example embodiment, the foregoing server for implementing sensitive information processing may further include:

a first monitoring strategy unit, which stores a preset sensitive information monitoring strategy;

a first to-be-processed sensitive information unit, which determines, according to the preset sensitive information monitoring strategy, whether a value of the variable information in the ModelMap in the MVC target system is to-be-processed sensitive information; and a first sending unit, which sends a variable name corresponding to the value of the variable information to the first sensitive information library when the first to-be-processed sensitive information unit determines that the value of the variable information is to-be-processed sensitive information.

In a server for implementing sensitive information processing provided by the present application, when the MVC target system 1010 receives an HTTP request of a user, the ModelMap module may generate a page template ModelMap, and then after the Controller module 12 in the MVC target system transmits information into a variable in the generated ModelMap, a postHandle processing program in postHandler of the interceptor 1012 may acquire variable information in the ModelMap. Further, the interceptor may send the acquired variable information to the sensitive information processing module 1014, and the sensitive information processing module 1014 may determine whether the variable information is sensitive information and process the sensitive information according to a preset sensitive information processing strategy, to form processed sensitive information. The MVC target system may receive the processed sensitive information sent by the sensitive information processing module 1014 and may substitute corresponding to-be-processed information in the page template ModelMap with the processed sensitive information, to complete rendering of the page. Then the server may return the page with the processed sensitive information to a client terminal of the user by using the returning module 14.

The MVC framework in the present application includes various spring mvc frameworks of a web application mode which are designed and created based on Model View Controller (MVC), for example, mvc framework structures such as sofa2, sofa3, and webx.

In a server for implementing sensitive processing provided by the present application, identification of sensitive information may be implemented on a server terminal, and information determined as sensitive information is processed on the server terminal according to a preset sensitive information processing strategy, such that sensitive information included in a page sent by the server to a browser on a client terminal of a user is processed sensitive information. An illegal user cannot acquire real sensitive information by means of data interception, local webpage modification, and the like, thus providing the security of sensitive information in a page.

According to the idea of identifying and processing the sensitive information in the sensitive information processing method, device and server of the present application, the present application further provides a security determination system, which may be used for determining whether a page server is secure and determining security performance of the page server, and may be further used for security comparison among multiple server systems and maintenance of a less secure server in time, to improve the security of the server.

Figure 11:
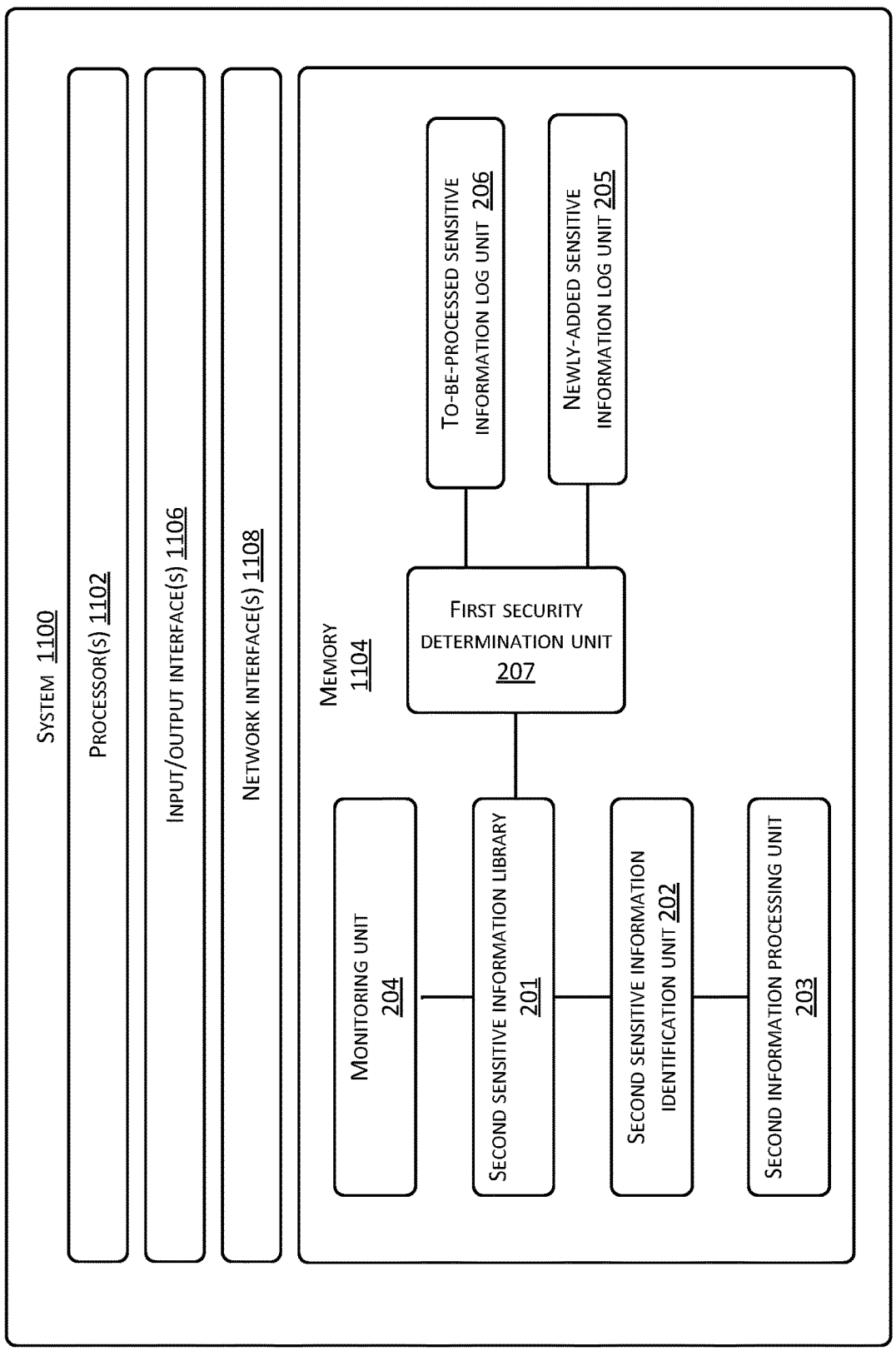
FIG. 11 is a modular schematic structural diagram of an example embodiment of a security determination system according to the present application.

FIG. 11 is a modular schematic structural diagram of the security determination system according to the present application. As shown in FIG. 11, a system 1100 includes one or more processor(s) 1102 or data processing unit(s) and memory 1104. The system 1100 may further include one or more input/output interface(s) 1106, and network interface(s) 1108. The memory 1104 is an example of computer readable media.

The memory 1104 may store therein a plurality of modules or units including:

a second sensitive information library 201, which stores sensitive information; receives a variable name sent by a second to-be-processed sensitive information unit(not shown in FIG. 11), determines whether the stored sensitive information includes the received variable name; and stores the variable name as newly-added sensitive information when the determination result is that the sensitive information library does not include the received variable name;

a second sensitive information identification unit 202, which acquires to-be-processed information in a page; and determines whether the to-be-processed information is sensitive information on the basis of the sensitive information stored in the second sensitive information library 201;

a second information processing unit 203, which stores a sensitive information processing strategy; and processes, when the second sensitive information identification unit 202 determines that the to-be-processed information is sensitive information, the to-be-processed information on the basis of the stored sensitive information processing strategy, to form processed sensitive information;

a monitoring unit 204, which stores a preset sensitive information monitoring strategy; determines, according to the stored sensitive information monitoring strategy, whether a value of variable information in a ModelMap in an MVC framework structure of the page server is to-be-processed sensitive information; and sends a variable name corresponding to the value of the variable information to the second sensitive information library 201 when determining that the value of the variable information is to-be-processed sensitive information;

the newly-added sensitive information log unit 205, which generates a newly-added sensitive information log, wherein the newly-added sensitive information log may include the number of newly-added sensitive information in the second sensitive information library 201;

a to-be-processed sensitive information log unit 206, which generates a to-be-processed sensitive information log, wherein the to-be-processed sensitive information log may include the number of to-be-processed sensitive information determined by the monitoring unit 204; and a first security determination unit 207, which acquires data in the newly-added sensitive information log or the to-be-processed sensitive information log or the second sensitive information library of a first target system, and determine, according to a preset determination rule, a security level to which the first target system belongs.

The first security determination unit 207 may include at least one of the following units:

a first number determination unit, which determine the security level of the first target system according to the number of the newly-added sensitive information in a first time window/the number of the sensitive information stored in the second sensitive information library within a first time window; and a first ratio determination unit, which determines the security level of the first target system according to a ratio of the number of the newly-added sensitive information to the number of the to-be-processed sensitive information in a second time window.

Specifically, for example, when the security level of the first target system is determined according to the number of the newly-added sensitive information in the first time window, the numbers of newly-added sensitive information corresponding to different security levels may be predefined. For example, the number of the newly-added sensitive information may be less than 100 pieces in the fourth security level, may be 100 to 1000 pieces in the third security level, may be 1001 to 5000 pieces in the second security level, and may be more than 5000 pieces in the first security level. In another implementation, the security level of the first target system may be determined according to the ratio of the number of the newly-added sensitive information to the number of the to-be-processed sensitive information in the second time window. A larger value of the ratio, which indicates that more to-be-processed sensitive information in newly founded to-be-processed sensitive information has been processed or that to-be-processed sensitive information in newly founded to-be-processed sensitive information is processed more timely, which may be used to represent higher security of the system. Correspondingly, a smaller value of the ratio, which may indicate more to-be-processed sensitive information that has not been processed in the to-be-processed sensitive information, may represent lower security of the system. Certainly, corresponding security levels may be defined according to the ratio, and for details, reference may be made to other example embodiments above. Details are not described herein again.

Figure 12:
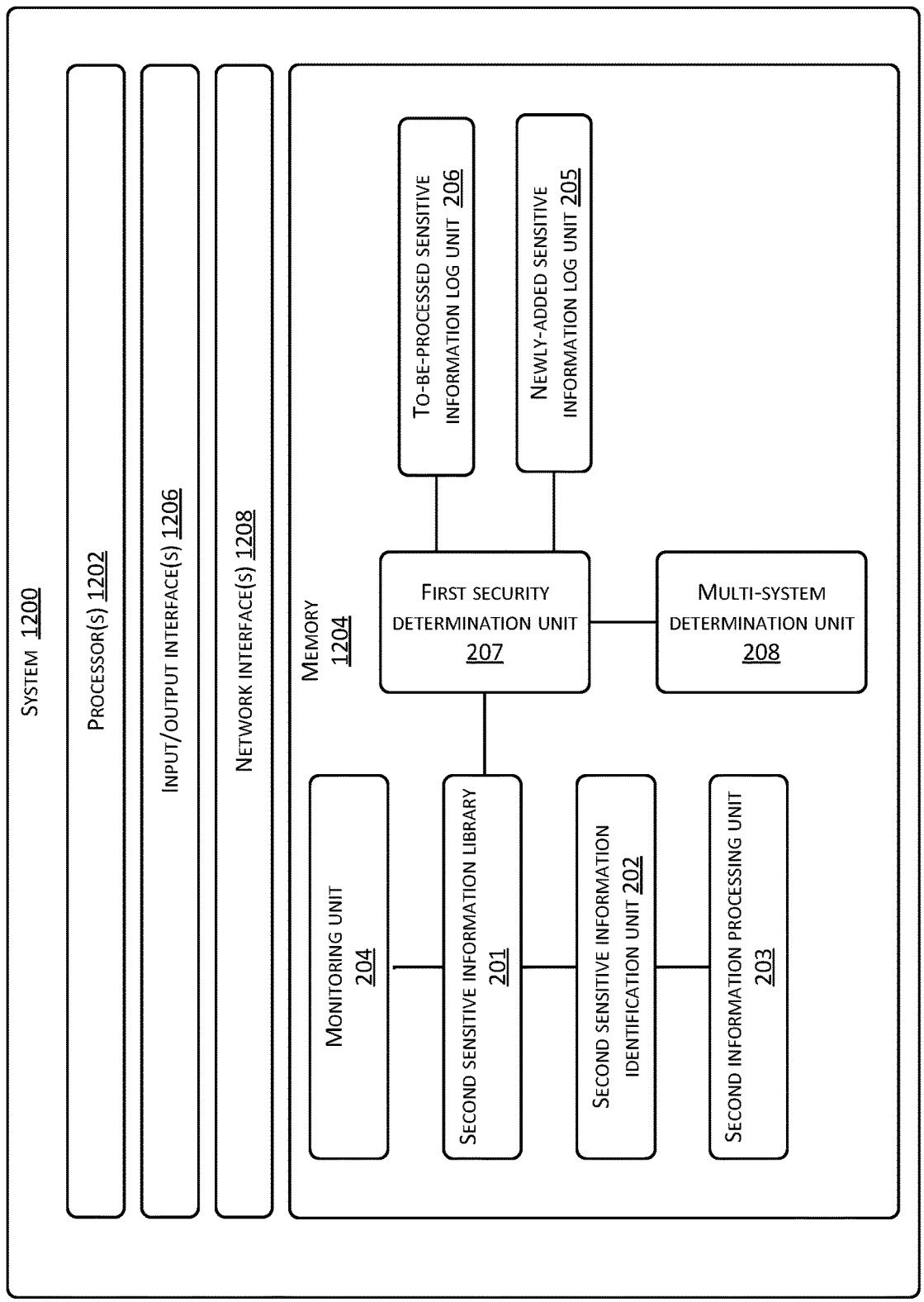
FIG. 12 is a modular schematic structural diagram of another example embodiment of the security determination system according to the present application.

FIG. 12 is a modular schematic structural diagram of another example embodiment of the security determination system according to the present application. As shown in FIG. 12, a system 1200 includes one or more processor(s) 1202 or data processing unit(s) and memory 1204. The system 1200 may further include one or more input/output interface(s) 1206, and network interface(s) 1208. The memory 1204 is an example of computer readable media.

The memory 1204 may store therein a plurality of modules or units, which in addition to those stored on memory 1104, further includes:

a multi-system determination unit 208, which compares the security level of the first target system with that of a second target system according to the preset determination rule. Correspondingly, the first security determination unit 207 may acquire data in the newly-added sensitive information log or the to-be-processed sensitive information log or the second sensitive information library of the second target system.

The multi-system determination unit 208 may include at least one of the following units:

a second number determination unit, which compares the security levels of the first target system and the second target system according to the numbers of the newly-added sensitive information in the first time window/the numbers of the sensitive information stored in the second sensitive information library of the first target system and the second target system; and a second ratio determination unit, which compares the security levels of the first target system and the second target system according to ratios of the numbers of the newly-added sensitive information of the first target system and the second target system to the number of the to-be-processed sensitive information in the second time window.

Specifically, for example, if it is obtained according to statistics that the number of the newly-added sensitive information of the first target system is greater than the number of the newly-added sensitive information of the second target system in one week, it may indicate that the security of the second target system is higher than that of the first target system. Certainly, if the ratio of the number of the newly-added sensitive information of the first target system to the number of the to-be-processed sensitive information is greater than the ratio of the number of the newly-added sensitive information of the second target system to the number of the to-be-processed sensitive information in a statistical cycle, it indicates that the first target processes the sensitive information in time and has higher security. It should be noted that, in the two manners above, the security level of the system is determined from different dimensions, for example, one system may include more newly-added sensitive information but the ratio is larger, which may indicate that initial security of the system is relatively low, but the security improves significantly due to timely maintenance.

A security determination system provided in the present application breaks away from the manner of determining whether a system is secure and a security level according to system vulnerabilities, the number of patches needing to be updated, and the like in the conventional techniques. The system for determining system security from the perspective of sensitive information provided in the present application can determine security performance of a target system according to sensitive information data that can be identified in the target system and whether the identified sensitive information is processed in time, and can make a more accurate security determination for the target system from the perspective of the essence of system security assessment. For example, if the target system can identify and process all sensitive information among a total of 100,000 pieces of sensitive information, or 99 among 100 pieces of newly found to-be-processed sensitive information are added to the second sensitive information library by means of an operation, even though it is determined in the conventional techniques that the target system has low security because there are M patches to be applied or N vulnerabilities in the target system, from the perspective of the essence of sensitive information identification and processing, the target system substantially is highly secure. By using the security determination system of the present application, the security of the target system can be determined more accurately. By using the present application, security of different target systems may be compared from different latitudes, and sensitive information of a less secure target system may be processed in time or other measures may be taken to maintain the target system, to improve the security of the system.

Although descriptions about protocols including HTTP are mentioned in the content of the present application, the present application is not limited to the case where the protocols including HTTP need to be completely standard. Some transmission mechanisms obtained after slight modifications on the protocol may also be used to implement the solutions of the foregoing example embodiments of the present application, for example, a transmission protocol of HTTPS or HTTP release 2.0. Certainly, even without using the HTTP protocol but using a private protocol, the same application can still be implemented as long as the protocol conforms to the page information interaction and information determination feedback manner in the foregoing example embodiments of the present application; details are not described herein again.

The device or module illustrated in the foregoing example embodiments may be specifically implemented by a computer chip or an entity, or implemented by a product with a particular function. For ease of description, the description of the device is divided, based on functions, into descriptions about various modules respectively. Certainly, in implementation of the present application, functions of the modules may be implemented in one or more pieces of software and/or hardware, or a module implementing one function may be implemented by a combination of multiple sub-modules or sub-units.

Those skilled in the art are also aware that, in addition to implementing the controller by using pure computer readable program code, logic programming may be performed on the methods and steps such that the controller implements the same function in the form of a logic gate, a switch, an application specific integrated circuit, a programmable logic controller, and an embedded microcontroller. Therefore, this kind of controller is deemed as a hardware component; and a device, which is included in the controller, for implementing various functions may also be deemed as an inner structure of the hardware component. Or even, the device for implementing various functions may be deemed as a software module for implementing the method, and deemed as an inner structure of the hardware component as well.

The present application may be described in the general context of computer executable instructions executed by a computer, for example, a program module. Generally, the program module includes a routine, a program, an object, a component or a data structure, a class, and the like for executing specific tasks or implementing specific abstract data types. The present application may also be realized in distributed computer environments. In such distributed computer environments, the tasks are executed by a remote processing device connected via a communications network. In the distributed computer environments, the program module may be located in local and remote computer storage media including a storage device.

Through the foregoing description of the foregoing implementations, those skilled in the art can clearly understand that the present application can be implemented by software plus a necessary universal hardware platform. Based on such understanding, the technical solution of the present application essentially, or the portion contributing to the conventional techniques may be embodied in the form of a software product. The software product may be stored in a storage medium, such as a ROM/RAM, a magnetic disk, or an optical disc, and include several instructions that enable a computer device (which may be a personal computer, a mobile terminal, a server, or a network device) to execute the method in the example embodiments or certain portions of the example embodiments of the present application.

Various example embodiments in the specification are described in a progressive manner. The same or similar parts between the example embodiments may be referenced to one another. In each example embodiment, the portion that is different from other example embodiments is focused and described. The present application may be applied to a lot of universal or dedicated computer system environments or configurations, for example, a personal computer, a server computer, a handheld device or a portable device, a tablet device, a multi-processor system, a microprocessor-based system, a set-top box, a programmable electronic device, a network PC, a minicomputer, a mainframe computer, and a distributed computing environment including any of the foregoing systems or devices.

Although the present application is described through the example embodiments, those of ordinary skill in the art should understand that the present application has many variations and changes without departing from the spirit of the present application, and it is desired that the appended claims include these variations and changes without departing from the spirit of the present application.

What is claimed is:

1. A method comprising:
   acquiring to-be-processed information in a page, the to-be-processed information including a value of variable information;
   determining that the to-be-processed information is sensitive information according to a variable name corresponding to the value;
   performing processing according to a preset sensitive information processing strategy to form processed sensitive information, the performing including setting the preset sensitive information processing strategy according to a privilege of a domain group to which the value belongs, different values corresponding to different preset sensitive information processing strategies for the variable name; and
   substituting the to-be-processed information in the page with the processed sensitive information, to form a page with the processed sensitive information.

2. The method of claim 1, wherein the acquiring the to-be-processed information in the page includes:
   acquiring the to-be-processed information in the page by using an interceptor after a Controller in an MVC framework structure is invoked and before a view is rendered; or
   acquiring the to-be-processed information in the page by using an interceptor after a Velocity in an MVC framework structure is invoked.

3. The method of claim 1, wherein the to-be-processed information includes:
   the variable information in a ModelMap in an MVC framework structure of a page server.

4. The method of claim 3, wherein the determining that the to-be-processed information is the sensitive information includes:
   acquiring the variable name in the ModelMap in the MVC framework structure of the page server;
   comparing the acquired variable name in the ModelMap with sensitive information stored in a sensitive information library; and
   determining that the to-be-processed information is the sensitive information in response to determining that the variable name is in the sensitive information library.

5. The method of claim 4, further comprising:
   determining, according to a preset sensitive information monitoring strategy, whether the value in the ModelMap in the MVC framework structure of the page server is to-be-processed sensitive information; and
   sending a variable name corresponding to the value of the variable information to the sensitive information library when it is determined according to the sensitive information monitoring strategy that the value of the variable information is to-be-processed sensitive information.

6. The method of claim 3, wherein the performing processing according to the preset sensitive information processing strategy includes:
   setting the preset sensitive information processing strategy for values corresponding to different variable names according to the different variable names.

7. The method of claim 6, wherein the preset sensitive information processing strategy includes at least one of the followings:
   non-processing;
   display of a predetermined part;
   completion of masking;
   privilege-based masking;
   display after transformation; and
   misinformation.

8. A device comprising:
   one or more processors; and
   one or more memories having stored thereon computer-readable instructions, which when executed, cause the one or more processors to perform acts comprising:
      acquiring to-be-processed information in a page, the to-be-processed information including a value of variable information;
      determining that the to-be-processed information is sensitive information on the basis of a variable name corresponding to the value stored in a sensitive information library; and
      performing processing according to a preset sensitive information processing strategy to form processed sensitive information, the performing including setting the preset sensitive information processing strategy according to a privilege of a domain group to which the value belongs, different values corresponding to different preset sensitive information processing strategies for the variable name.

9. The device of claim 8, wherein the to-be-processed information includes:
   the variable information in a ModelMap in an MVC framework structure of a page server.

10. The device of claim 9, wherein the performing processing according to the preset sensitive information processing strategy includes:
    setting the preset sensitive information processing strategy for values corresponding to different variable names according to the different variable names.

11. The device of claim 9, wherein the preset sensitive information processing strategy includes at least one of the following:
    displaying a particular field of the value corresponding to the variable name according to a predetermined display rule;
    masking all fields of the value corresponding to the variable name according to a predetermined masking rule;
    processing the value corresponding to the variable name according to a privilege of a specified field;
    transforming the value corresponding to the variable name according to a predetermined transformation rule, and use the transformed value as the value of the variable name; and
    skipping processing the value corresponding to the variable name.

12. The device of claim 9, wherein the determining that the to-be-processed information is the sensitive information includes:
    acquiring the variable name in the ModelMap in the MVC framework structure of the page server;
    determining that the acquired variable name in the ModelMap is the same as the sensitive information stored in a sensitive information library; and determining that the to-be-processed information is the sensitive information.

13. The device of claim 9, wherein the acts further comprise:
  storing a preset sensitive information monitoring strategy;
  determining, according to the preset sensitive information monitoring strategy, whether a value of the variable information in the ModelMap in the MVC framework structure of the page server is to-be-processed sensitive information; and
  sending the variable name corresponding to the value of the variable information to the sensitive information library in response to determining that the value of the variable information is to-be-processed sensitive information.

14. The device of claim 9, wherein the acts further comprise:
  directly sending the processed sensitive information to a server by using an interceptor.

15. The device of claim 9, wherein the acts further comprise:
  substituting the to-be-processed information in the page with the processed sensitive information.

16. One or more memories having stored thereon computer-readable instructions, which when executed, cause one or more processors to perform acts comprising:
  acquiring to-be-processed information in a page, the to-be-processed information including a value of variable information;
  determining that the to-be-processed information is sensitive information according to a variable name corresponding to the value;
  performing processing according to a preset sensitive information processing strategy to form processed sensitive information, the performing including setting the preset sensitive information processing strategy according to a privilege of a domain group to which the value belongs, different values corresponding to different preset sensitive information processing strategies for the variable name.

17. The one or more memories of claim 16, wherein the acts further comprise substituting the to-be-processed information in the page with the processed sensitive information, to form a page with the processed sensitive information.

18. The one or more memories of claim 16, wherein the acquiring the to-be-processed information in the page includes:
  acquiring the to-be-processed information in the page by using an interceptor after a Controller in an MVC framework structure is invoked and before a view is rendered; or
  acquiring the to-be-processed information in the page by using an interceptor after a Velocity in an MVC framework structure is invoked.

19. The one or more memories of claim 16, wherein the to-be-processed information includes:
  the variable information in a ModelMap in an MVC framework structure of a page server.

20. The one or more memories of claim 16, wherein the performing processing according to the preset sensitive information processing strategy includes:
  setting the preset sensitive information processing strategy for values corresponding to different variable names according to the different variable names.

* * * * *